(12) United States Patent
Okuyama

(10) Patent No.: US 6,590,713 B2
(45) Date of Patent: Jul. 8, 2003

(54) IMAGE OBSERVATION APPARATUS AND IMAGE OBSERVATION SYSTEM

(75) Inventor: Atsushi Okuyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/983,722

(22) Filed: Oct. 25, 2001

(65) Prior Publication Data
US 2002/0070904 A1 Jun. 13, 2002

(30) Foreign Application Priority Data

Oct. 26, 2000 (JP) ........................................ 2000-327097

(51) Int. Cl.⁷ ............................................... G02B 27/14
(52) U.S. Cl. ........................ 359/631; 359/633; 359/638
(58) Field of Search ................................ 359/630, 631, 359/633, 637, 638

(56) References Cited

U.S. PATENT DOCUMENTS

| | | | |
|---|---|---|---|
| 4,711,512 A | 12/1987 | Upatnieks | 345/7 |
| 4,775,217 A | 10/1988 | Ellis | 313/524 |
| 5,453,877 A | 9/1995 | Gerbe et al. | 359/633 |
| 5,629,799 A | 5/1997 | Maruyama et al. | 359/565 |
| 5,661,604 A * | 8/1997 | Kuba | 359/633 |
| 5,768,025 A | 6/1998 | Togino et al. | 359/633 |
| 5,790,311 A | 8/1998 | Togino | 359/630 |
| 2001/0009478 A1 | 7/2001 | Yamazaki et al. | 359/630 |
| 2001/0013974 A1 | 8/2001 | Araki et al. | 359/566 |

FOREIGN PATENT DOCUMENTS

| | | |
|---|---|---|
| EP | 0 766 115 | 4/1997 |
| EP | 0 790 516 | 8/1997 |
| JP | 7-333551 | 12/1995 |
| JP | 9-65246 | 3/1997 |
| JP | 2001142025 A * | 5/2001 ........... G02B/27/02 |

* cited by examiner

Primary Examiner—Ricky Mack
(74) Attorney, Agent, or Firm—Fitzpatrick, Cella, Harper & Scinto

(57) ABSTRACT

In an image observation apparatus, image light is guided to an observer's eye by using a first refractive surface on which the image light from an image display device is made incident, a reflective surface for reflecting the image light made incident from the first refractive surface, and an optical element having a second refractive surface for emitting the image light reflected from the reflective surface. A diffraction optical part is provided in front of the reflective surface of the optical element.

30 Claims, 22 Drawing Sheets

$n_1 \neq n_2$

IMAGE OBSERVATION APPARATUS AND IMAGE OBSERVATION SYSTEM

BACKGROUND OF THE INVENTION

1. Field of the Invention

The present invention relates to an image observation apparatus such as a head-mounted display, a glasses-type display, a camera finder, or the like.

2. Description of the Related Art

An image observation apparatus such as a head-mounted display or the like is equipped with an observation optical system for projecting an enlarged virtual image of an image displayed on an image display device to an observer's eye, and conventionally, various observation optical systems are proposed for downsizing the entirety of the device.

For example, in Japanese Patent Laying-Open No. H07-333551 (corresponding U.S. Patent Application Publication No. 20010009478), an observation optical system is proposed, wherein a prism-shaped projecting optical element is used, which is comprised of first, second and third surfaces all having rotational asymmetric shapes, and has a symmetry shape for one symmetry plane, and an image displayed on an image display device is projected to an observer's eye as an enlarged image.

Use of this prism-shaped optical element allows an extremely compact and simple construction to sufficiently correct image distortion, curvature of the image plane, and astigmatism.

However, in such an observation optical system, when the angle of light to be guided to the eye (angle of view) is set to be great, chromatic aberration occurs due to light refraction when the light exits from the exit surface at the eye side. However, if such a prism-shaped projecting optical element is composed of a single material, so-called chromatic alternation correction is difficult. Therefore, it has been conventionally difficult to correct chromatic aberrations.

Accordingly, a construction for an observation optical system is proposed in Japanese Patent Laying-Open No. H09-65246 (corresponding U.S. Pat. No. 5,768,025) wherein a diffraction surface having a dispersion property in reverse to that of the refractive surface is used for a part of the optical system so as to correct chromatic aberrations occurring at the refractive surface.

FIG. 24 and FIG. 25 show an observation optical system having the prism-shaped projecting optical element P disclosed in the abovementioned Japanese Unexamined Patent Publication No. H09-65246. In these figures, E shows an observer's pupil, and I shows an image display device. In FIG. 24, 101 denotes a first surface of the projecting optical element P, 103 (104) denotes a second surface, 102 denotes a third surface, and 112 denotes a diffraction optical element. On the other hand, in FIG. 25, 121 denotes a first surface of the projecting optical element P, 123 (124) denotes a second surface, 122 denotes a third surface, and 125 denotes a diffraction optical element.

As shown in FIG. 24, the construction in which the diffraction optical element 112, which is completely separate from the projecting optical element P, is additionally provided at the eye (pupil E) side of the observation optical system, not only increases the number of components of the apparatus, but also requires control with high accuracy of the space and positions of the diffraction optical element 112 and projecting optical element P, and causes the shapes of members for holding the diffraction optical element 112 and projecting optical element P to become complicated and increase in size.

Furthermore, as shown in FIG. 25, if the diffraction optical element 125 is provided at the incidence surface 121 of the projecting optical element P, normally, Fno. of the observation optical system becomes greater (darker), and the focal depth increases, so that a discontinuous shape of the diffraction surface is exposed to an observer's eye.

SUMMARY OF THE INVENTION

In order to solve these problems, in the invention, in an image observation apparatus, which is comprised of an image display element for displaying images, and a plurality of optical action surfaces including a first refractive surface on which image light from the image display element is made incident, a reflective surface for reflecting the image light made incident from this first refractive surface, and a second refractive surface for emitting the image light reflected by this reflective surface, and a projecting optical element for guiding the image light to an observer's eye, a diffraction optical part having a diffraction effect is provided in an integral manner with the optical element on the reflective surface or in the vicinity of the reflective surface.

Thereby, chromatic aberrations in an image due to light refraction at the first and second refractive surfaces (particularly, chromatic aberrations at the peripheral portion) can be satisfactorily corrected without control with high accuracy in the space between the diffraction optical element and projecting optical element and without causing the shapes of members for holding the diffraction optical element and projecting optical element to become complicated and increase in size.

Furthermore, in the case where the second refractive surface is a surface for reflecting image light, which has been made incident inside the optical element from the first refractive surface, toward the reflective surface, and emitting the image light reflected by this reflective surface toward the outside of the optical element, that is, the second refractive surface has a plurality of functions including reflection and transmission (particularly, when the reflection region and transmission region overlap each other), it is difficult to provide a diffraction optical part on this second refractive surface in terms of design. Furthermore, if a diffraction optical part is provided on the first refractive surface as an incidence surface, a discontinuous shape of the diffraction surface is exposed to the observer's eye as mentioned above. Therefore, the provision of a diffraction optical part on (or in the vicinity of) the reflective surface makes it possible to correct chromatic aberrations in images without problems such that the shape of the diffraction surface is exposed to the observer's eye.

In addition, although the height of the step of the diffraction grating becomes equal to the wavelength $\lambda$ of the image light when a diffraction optical part is provided on the refractive surface through which image light transmits, the provision of the diffraction optical part on the reflective surface makes it possible to set the height of the step of the diffraction grating to $\lambda/2$, and manufacturing of the grating (including mold manufacturing and cutting) becomes easier.

Furthermore, the reflective surface on which the diffraction optical part is provided desirably has the most strong optical power (1/f:reciprocal of the focal length) among the plurality of optical action surfaces of the optical element. Thereby, chromatic aberrations in an image can be effectively corrected.

Furthermore, when the base shape of the reflective surface is formed to be asymmetric without a symmetry axis, the diffraction optical part may be shaped so that the shape of the part is added to the base shape of this reflective surface. Thereby, aberrations other than chromatic aberrations occurring at the diffraction optical part are canceled by the base shape of the reflective surface, and only chromatic aberrations are effectively corrected by the diffraction optical part.

In addition, when the plurality of optical action surfaces of the optical element are constructed to be decentering systems, respectively, by forming the grating structure of the diffraction optical part to be asymmetric without a symmetry axis, decentering aberrations and asymmetric chromatic aberrations that occur when the optical actions surface are used in the decentering condition can be effectively corrected.

Moreover, the step-like grating structure comprising the diffraction optical part is directly formed on the reflective surface, and reflective layers are provided on the surface of this grating structure, whereby chromatic aberrations can be corrected by a simple construction.

Furthermore, the optical element may be constructed so that a grating structure comprising a diffraction optical part is formed at the surface of a first substance having the first refractive surface and the second refractive surface, the reflective surface is disposed in the vicinity of the grating structure surface, and a second substance, which is different from the first substance is filled between the grating structure surface and reflective surface. In this case, it is preferable that the first substance and the second substance are made to be different from each other in refractive index and Abbe's number.

Thereby, the optical dispersion value of the medium differs between the front and rear of the grating structure surface, and the diffraction efficiency at the diffraction optical part can be totally increased while being made almost even in a used wavelength region.

DETAILED DESCRIPTION OF THE PREFERRED EMBODIMENT

Figure 23:
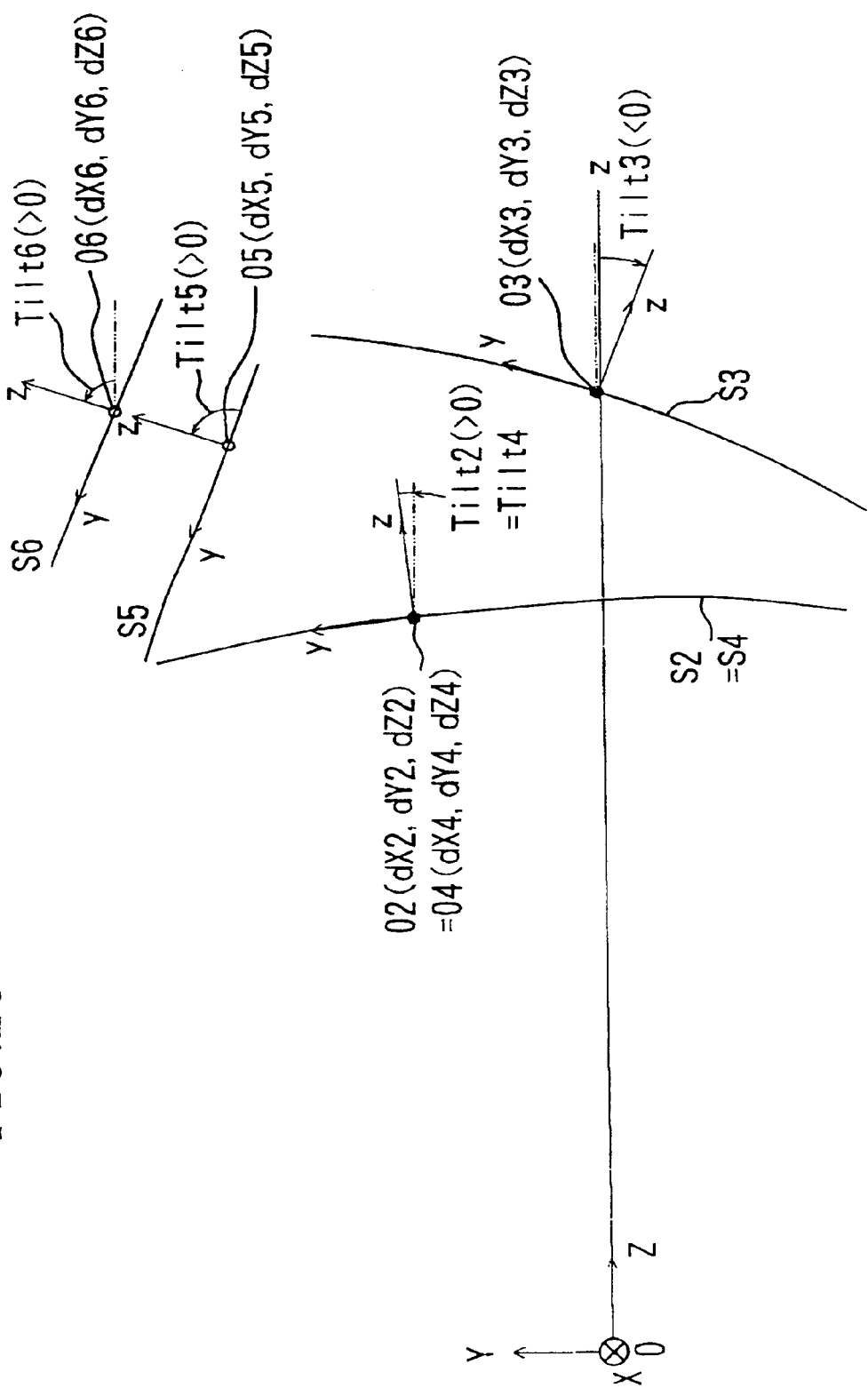
FIG. 23 is an explanatory view of frames of reference in each embodiment of the invention.
Figure 24:
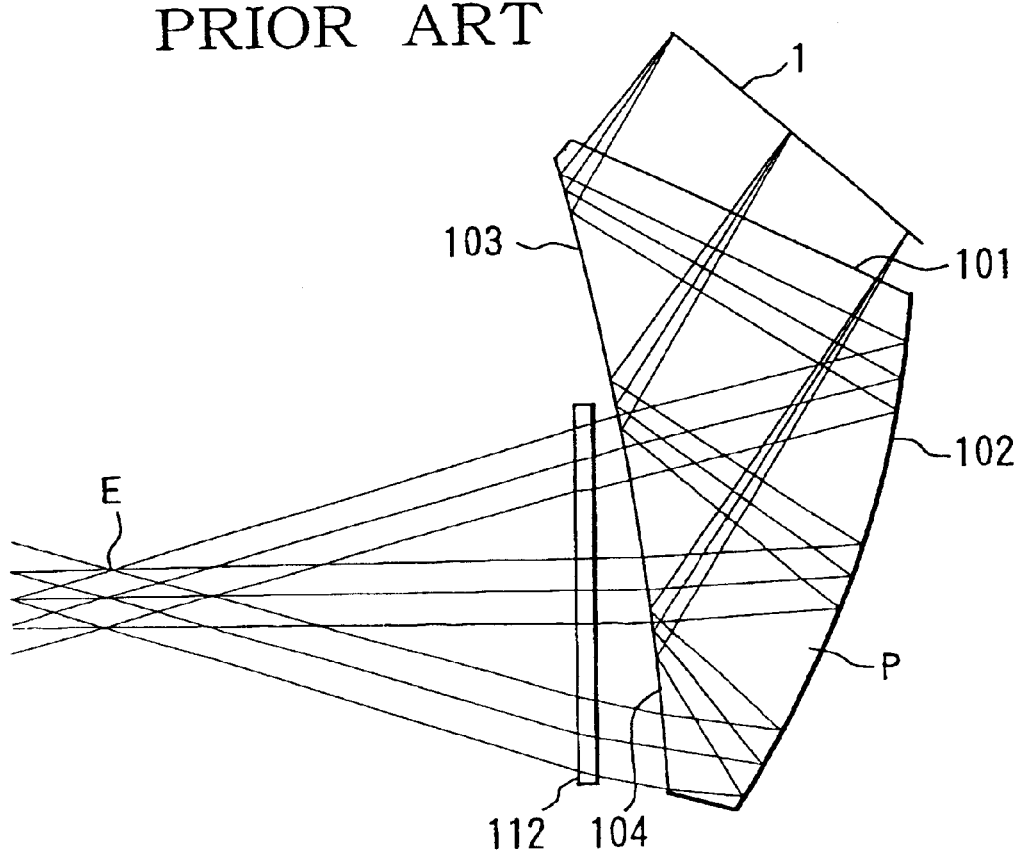
FIG. 24 is a drawing showing the construction of a prior image observation apparatus.
Figure 25:
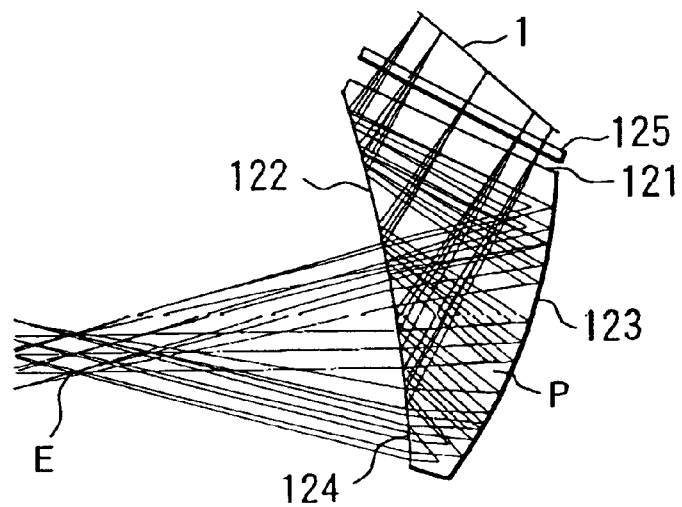
FIG. 25 is a drawing showing the construction of a prior image observation apparatus.

First, since the optical system to be explained in this embodiment is comprised of decentering surfaces, in order to show the shape of the optical system, as shown in FIG. 23, a global coordinates system (X, Y, Z) and local coordinates system (x, y, z) are set.

Herein, the angle of tilt i between the Z axis of the global coordinates system and z axis of a local coordinates system is regarded as positive when it is an angle tilting counterclockwise from the X axis of the local coordinates system on the paper of the figure.

Herein, the origin of the global coordinates system is set to the center O of the desirable pupil position of an observer. The Z-axis is a straight line, which passes through the point O and is perpendicular to the pupil plane, and set on the symmetric plane of the optical system (on the paper surface of the figure) The Y-axis is a straight line, which passes through the origin O and has an angle of 90° counterclockwise from the Z-axis on the symmetric plane. The X-axis is a straight line, which passes through the origin O and is orthogonal to the Y- and Z-axes.

The origin Oi of the local coordinates system is set for each surface Si in the global coordinates system (dXi, dYi, dZi). The shape of each surface is expressed as functions based on the local coordinates system.

The asymmetric optical action surfaces in this embodiment are shaped so as to have aspherical surfaces by means of shape functions expressing quadratic surfaces and power polynomials, and are expressed by the following functions.

$$z = \frac{c(x^2 + y^2)}{1 + \{1 - c^2(x^2 + y^2)\}^{1/2} + c4\,x^2 + c6\,y^2 + c8\,x^2y + c10\,y^3 + c11\,x^4 + c13\,x^2y^2 + c15\,y^4} \quad (1)$$

Herein, c shows the curvature of each surface, and on the assumption that r is a basic radius of curvature of each surface, the curvature c equals 1/r, and x and y are local coordinates of asymmetric planes. In addition, cj shows aspherical coefficients of power polynomials in each surface.

The optical system of this embodiment is symmetric with respect to the YZ plane, so that the expression excludes asymmetric terms in the x-axis direction.

The shape of an optical action surface having a toroidal surface shape is expressed by $c_x$ and $$z = \frac{c_y\,y^2}{1 + (1 - c_y^2 y^2)^{1/2}}. \quad (2)$$

Herein, $c_y$ and $c_x$ are curvatures in the direction y and x direction, and when the $r_y$ and $r_x$ are radiuses of curvature in the y direction and x direction, the curvature $c_y$ equals $1/r_y$, the curvature $c_x$ equals $1/r_x$, and y is a local coordinate of the toroidal surface.

Figure 27:
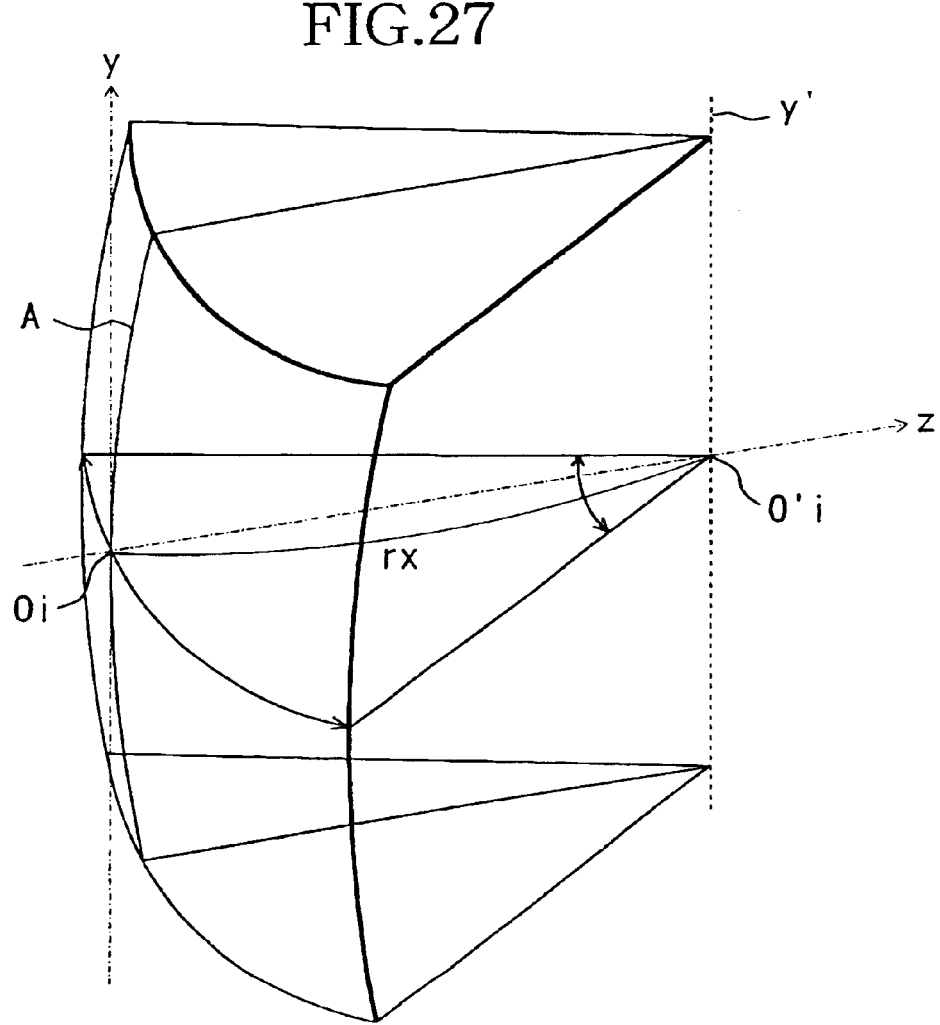
FIG. 27 is an explanatory view of definitions of surfaces in each embodiment of the invention.

As shown in FIG. 27, this shape is obtained by rotating the shape A within the yz plane, which is expressed by equation (2), about the axis y' parallel to the y axis at the position Oi' separated by $r_x$ in the z direction from the surface origin Oi.

Next, the diffraction action surface is explained. The diffraction action surface is obtained by forming a diffraction grating expressed by the following phase function on an optional reference surface.

$$\Psi(x,y) = 2\pi(p2y + p3x^2 + p5y^2 + p7x^2y + p9y^3 + p10x^4 + p12x^2y^2 + p14y^4)/\lambda \quad (3)$$

Herein, $\lambda$ is an optional wavelength, x and y are local coordinates of a diffraction action surface, and pi is an i-th phase coefficient in the diffraction action surface. From this phase function, the pitch of the diffraction grating at a position of optional coordinates can be calculated.

The diffraction grating has a shape in which steps are generated at positions of a phase relational equation (2) of mk$\lambda$/2 (m=1, 2 ... n (integers)), and the intervals of the steps become the pitches of the diffraction grating. Herein, k shows a diffraction order to be used as a diffraction ray.

Furthermore, the lens data is set so that the absolute origin O of coordinates is regarded as a first surface S1 and an image display surface is an image plane, and defined as an optical system tracing in reverse to the advance of actual light.

(First Embodiment)

Figure 1:
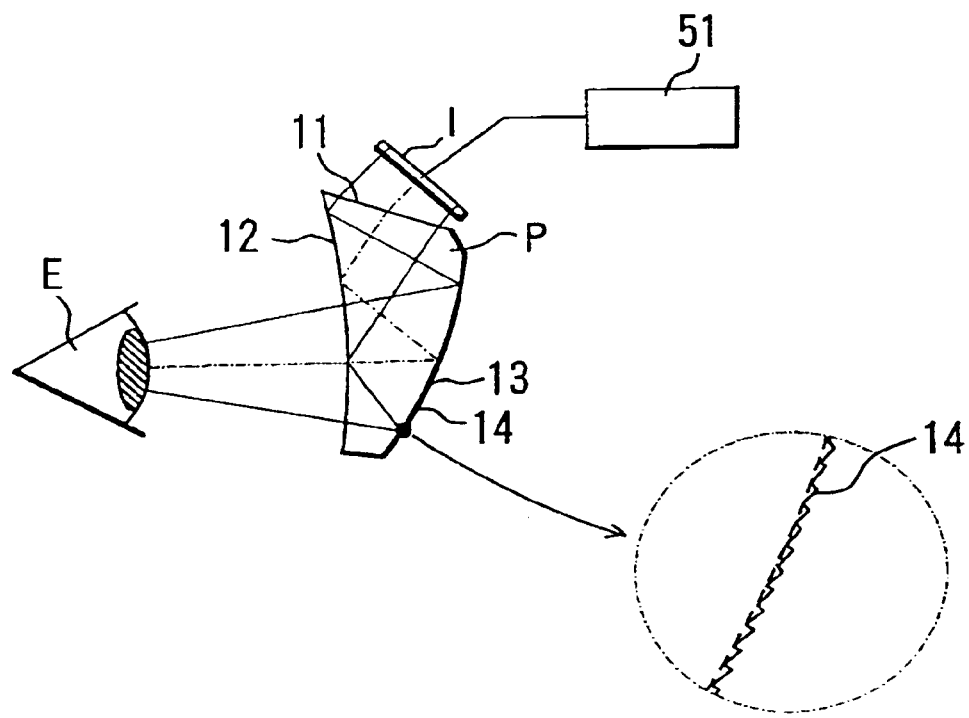
FIG. 1 is a drawing showing a construction of a head-mounted display of a first embodiment of the invention.

FIG. 1 shows the construction of a head-mounted display (image observation apparatus) of a first embodiment of the invention. In this figure, P shows a prism lens comprising a projecting optical element, I shows an image display device (element) such as a liquid crystal display panel or the like, and E shows an observer's eye (pupil).

The head-mounted display of this embodiment is connected to image supply apparatus 51 such as a video player, television, personal computer, DVD, or the like to comprise an image observation system. When image information is supplied to a drive circuit (not shown) of an image display device I of this head-mounted display from the image supply apparatus 51, the image is displayed on the image display device I, and the image that has been enlarged by a prism lens P (virtual image) is observed by an observer.

The prism lens P of this embodiment is comprised of three surfaces, wherein light (image light) made incident on the first surface (first refractive surface) 11 of the prism lens P is made incident on the second surface (second refractive surface) 12 at an angle greater than the critical angle, totally reflected by this second surface 12, and then reflected by the third surface (reflective surface) 13, and furthermore, transmitted through the second surface 12, and reaches the observer's eye E.

Furthermore, the light reflection region and transmission region of the second surface 12 partially overlap each other.

Four of lens data (numerical examples) in a head-mounted display thus constructed are shown below.

In this embodiment, the first surface 11 and third surface 13 are asymmetric surfaces determined by equation (1), and the second surface 12 is a toroidal surface determined by equation (2). The diffraction optical part 14 is a phase type diffraction grating, and is shaped so as to provide phases expressed by equation (3) on the third surface 13 that has the highest optical power among the three optical action surfaces.

Furthermore, in this embodiment, the base shape of the third surface 13 is formed to be asymmetric without a symmetry axis, and the shape of the diffraction optical part 14 is formed in an additional manner to the base shape of the third surface 13.

Moreover, reflective layers are provided on the surface of the grating structure of the diffraction optical device 14, and these reflective layers comprise a reflective surface.

NUMERICAL EXAMPLE 1

When the total field angles in the x and y directions are, respectively, 2$\omega$x and 2$\omega$y with respect to an image, $\omega$x=11.2°, $\omega$y=15.0°.

Surfaces 2 through 5 show a prism lens P, and the medium of the prism lens P is 1.57 in the refractive index and 38 in Abbe's number. In the prism lens P, surfaces 3 and 4 show the reflective surfaces, and surfaces 2 and 4 are the same surface. Furthermore, surface 1 is a pupil plane, and surface 6 is a display surface of the image display device I.

s1 r: ∞ d: 34.04 n: 1.0000
s2 dY 13.42 dZ 34.04 Tilt 4.39
   c4: −4.613e−03 c6: −3.975e−04 c8: −4.042e−05
   c10: 2.797e−06 c11: 0.000e+00 c13: 0.000e+00
   c15: 0.000e+00
s3 dY−1.24 dZ 46.49 Tilt−21.63
   ry: −89.850 rx: −63.176
   p2: 6.994e−04 p3: −5.277e−04 p5: −2.702e−04
   p7: −3.800e−06 p9: 5.933e−06 p10: 3.291e−07
   p12: 7.644e−07 p14: 0.000e+00
s4 dY 13.42 dZ 34.04 Tilt 4.39
   c4: −4.613e−03 c6: −3.975e−04 c8: −4.042e−05
   c10: 2.797e−06 c11: 0.000e+00 c13: 0.000e+00
   c15: 0.000e+00
s5 dY 21.37 dZ 47.36 Tilt 60.99
   r: −136.456
   c4: −8.038e−03 c6: −7.256e−04 c8: 4.379e−04
   c10: 3.264e−04 c11: 0.000e+00 c13: 0.000e+00
   c15: 0.000e+00
s6 dY 28.38 dZ 48.16 Tilt 40.53
   r: ∞ d: 0.00 n: 1.0000

The phase functions of this numerical example are for use of +1st order diffraction light of the diffraction grating.

Figure 2:
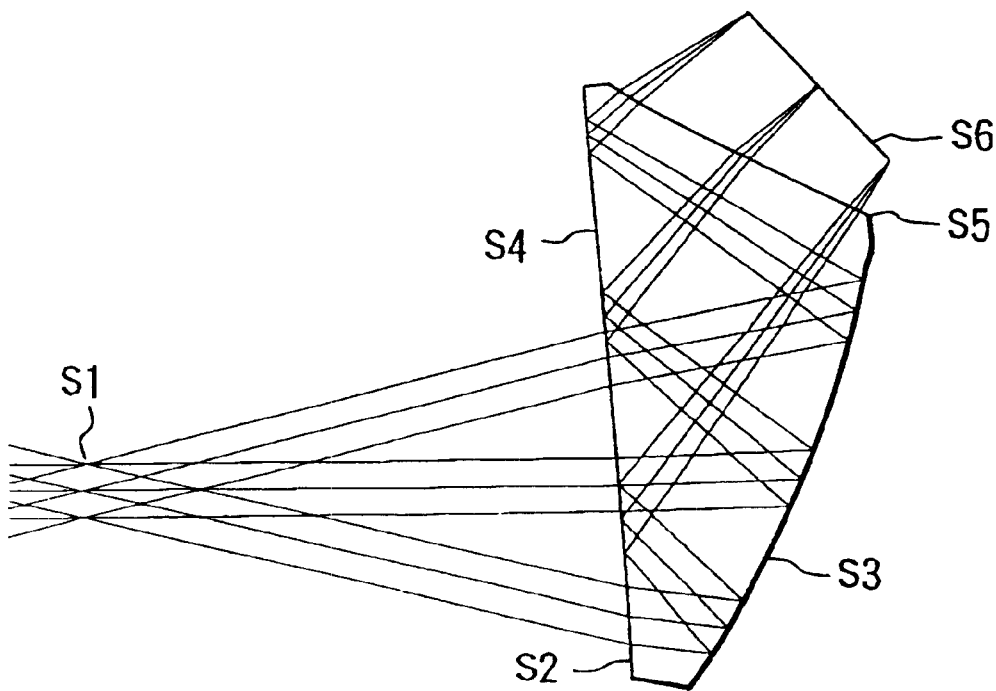
FIG. 2 is a diagram of optical paths of numerical example 1 in the first embodiment.
Figure 3:
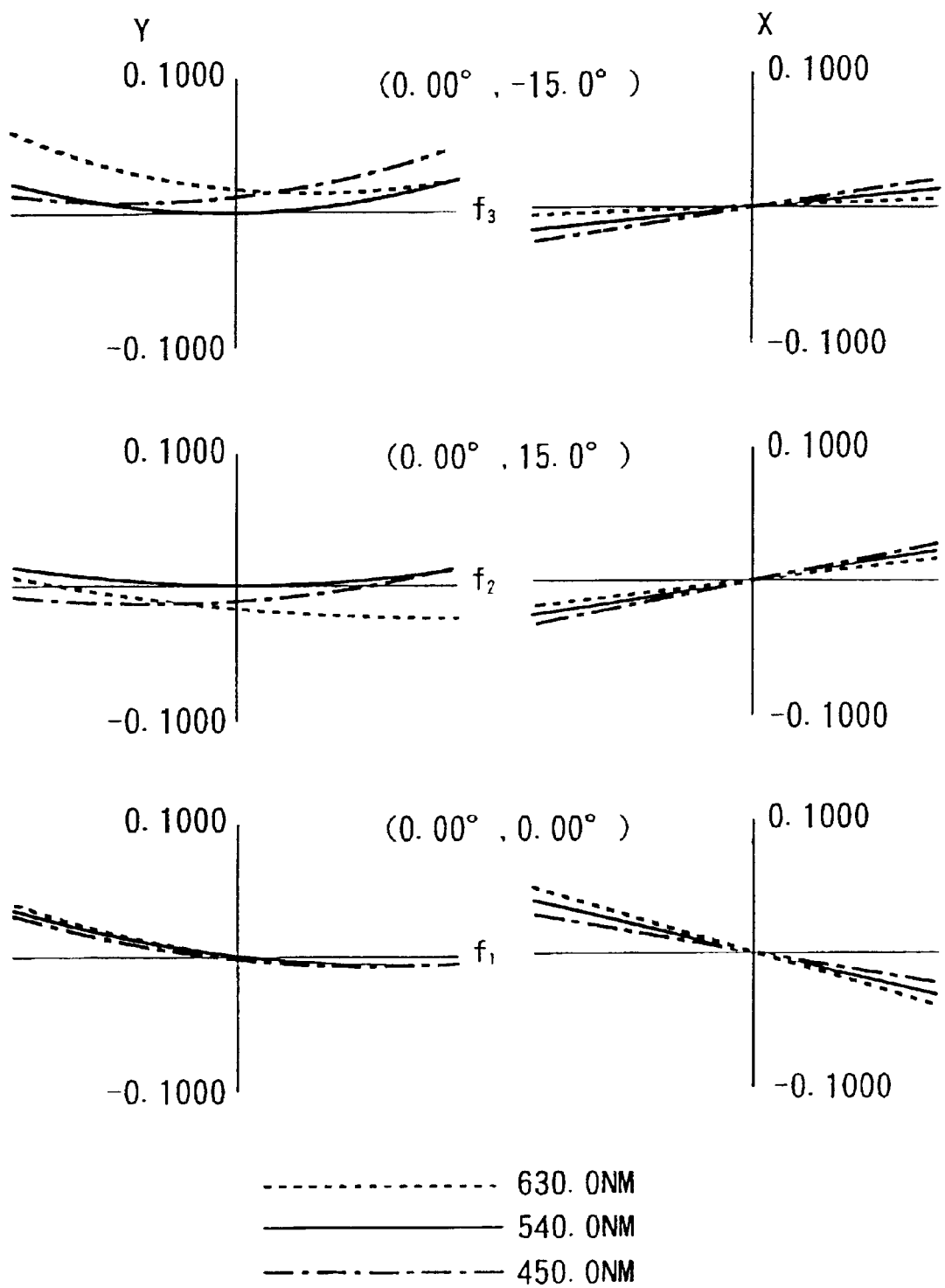
FIG. 3 are transverse aberration diagrams of numerical example 1 in the first embodiment.
Figure 4:
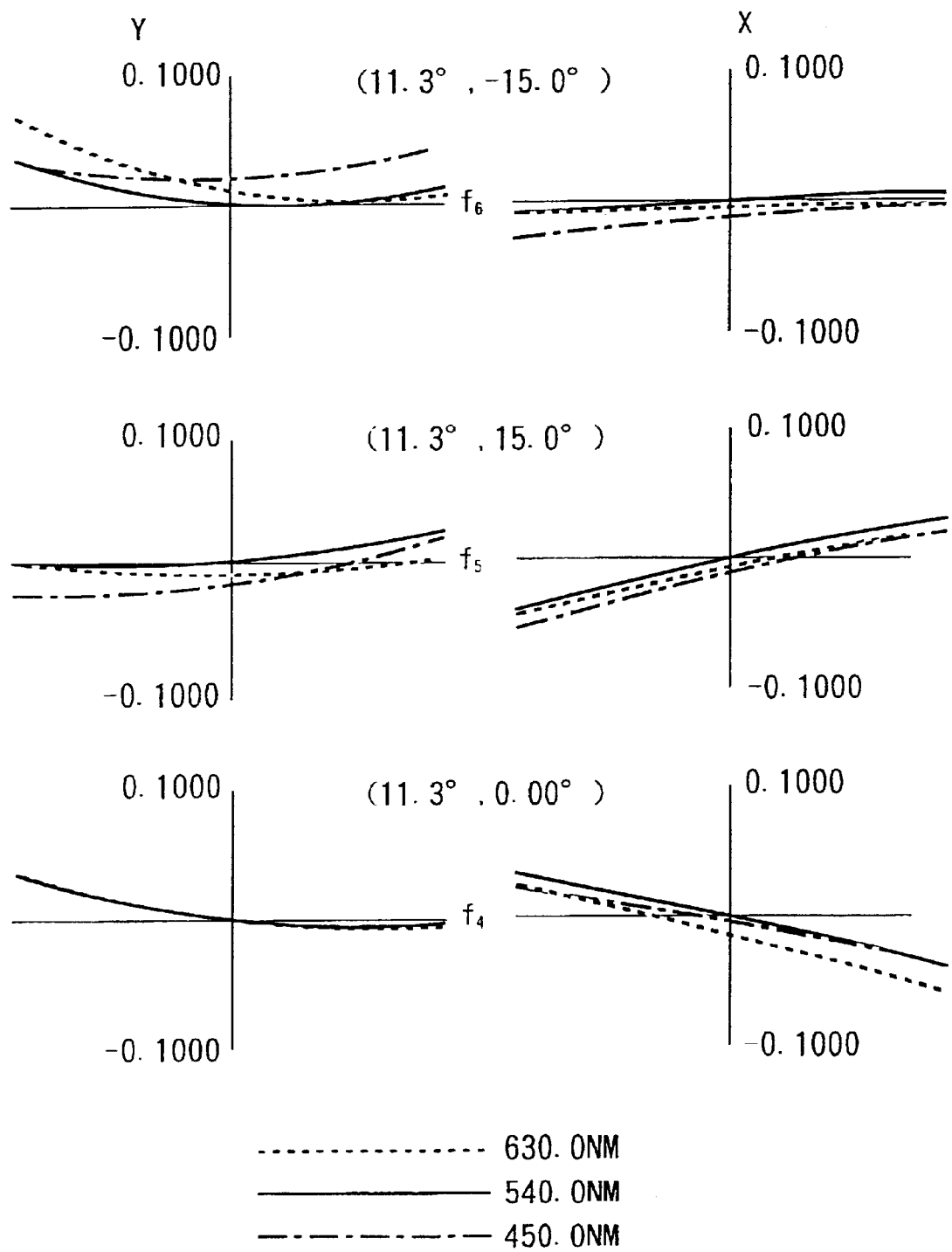
FIG. 4 are transverse aberration diagrams of numerical example 1 in the first embodiment.
Figure 26:
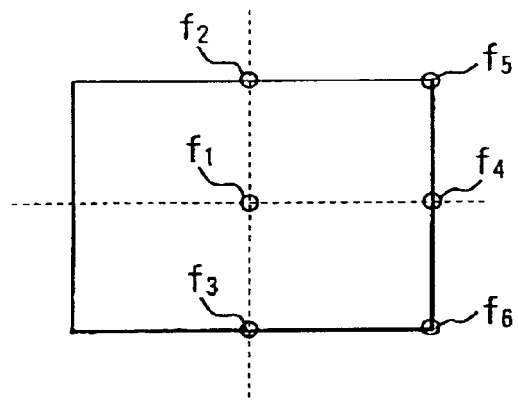
FIG. 26 is a diagram showing points on image display devices to be used for each embodiment of the invention.

FIG. 2 is a diagram of optical paths in this numerical example 1, and FIG. 3 and FIG. 4 show aberrations in the y direction and x direction of light fluxes reaching the points (f1, f2, f3, f4, f5, and f6) on the image display device shown in FIG. 26 from the pupil E.

NUMERICAL EXAMPLE 2

$\omega x=11.2°$, $\omega y=15.0°$

Surfaces 2 through 5 show a prism lens P, and the medium of the prism lens P is 1.57 in the refractive index and 38 in Abbe's number. In the prism lens P, surfaces 3 and 4 show reflective surfaces, and surfaces 2 and 4 are the same surface. Surface 1 is a pupil plane, and surface 6 is a display surface of the image display device I.

s1 r: ∞ d: 34.04 n: 1.0000
s2 dY 12.94 dZ 34.04 Tilt 4.24
   c4: −4.578e−03 c6: −3.358e−04 c8: −4.082e−05
   c10: 3.214e−06 c11: 0.000e+00 c13: 0.000e+00
   c15: 0.000e+00
s3 dY−1.28 dZ 46.50 Tilt−21.64
   ry: −90.702 rx: −63.459
   p2: −7.112e−04 p3: 5.408e−04 p5: 2.755e−04
   p7: 4.035e−06 p9: −5.887e−06 p10: −3.757e−07
   p12: −7.680e−07 p14: 0.000e+00
s4 dY 12.94 dZ 34.04 Tilt 4.24
   c4: −4.578e−03 c6: −3.358e−04 c8: −4.082e−05
   c10: 3.214e−06 c11: 0.000e+00 c13: 0.000e+00
   c15: 0.000e+00
s5 dY 21.30 dZ 47.50 Tilt 60.85
   r: −137.004
   c4: −8.574e−03 c6: −4.632e−04 c8: 4.370e−04
   c10: 3.135e−04 c11: 0.000e+00 c13: 0.000e+00
   c15: 0.000e+00
s6 dY 28.37 dZ 48.23 Tilt 40.30
   r: ∞ d: 0.00 n: 1.0000

The phase functions of this numerical example are for use of −1st order diffraction light of the diffraction grating.

Figure 5:
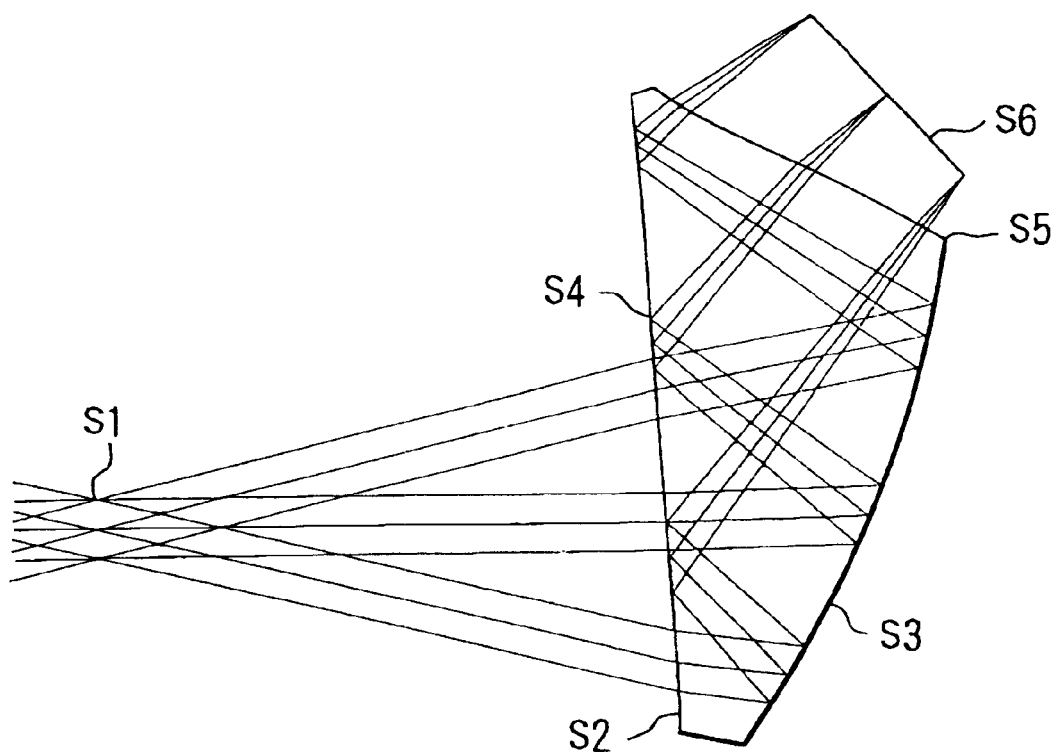
FIG. 5 is a diagram of optical paths of numerical example 2 in the first embodiment.
Figure 6:
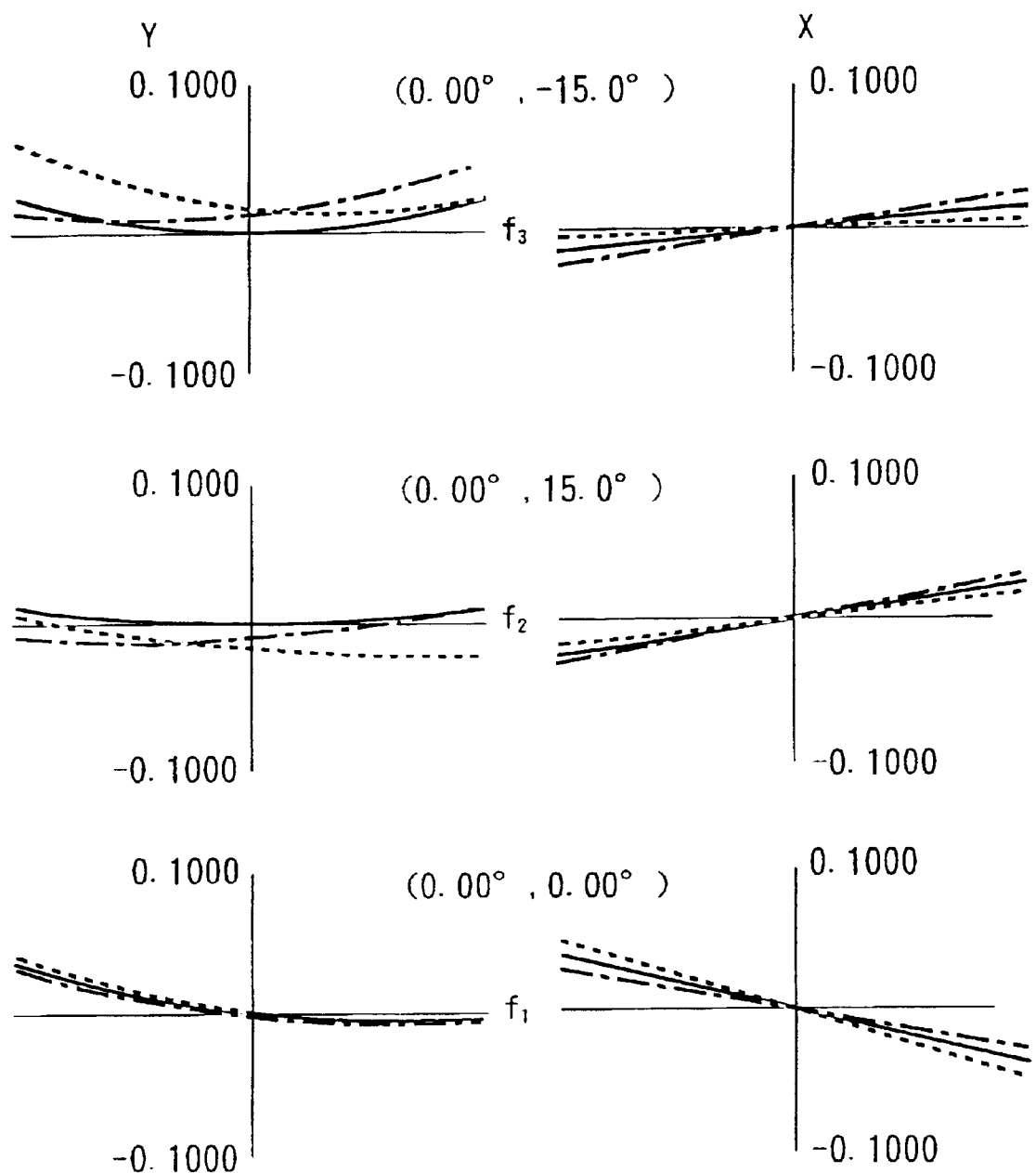
FIG. 6 are transverse aberration diagrams of numerical example 2 in the first embodiment.
Figure 7:
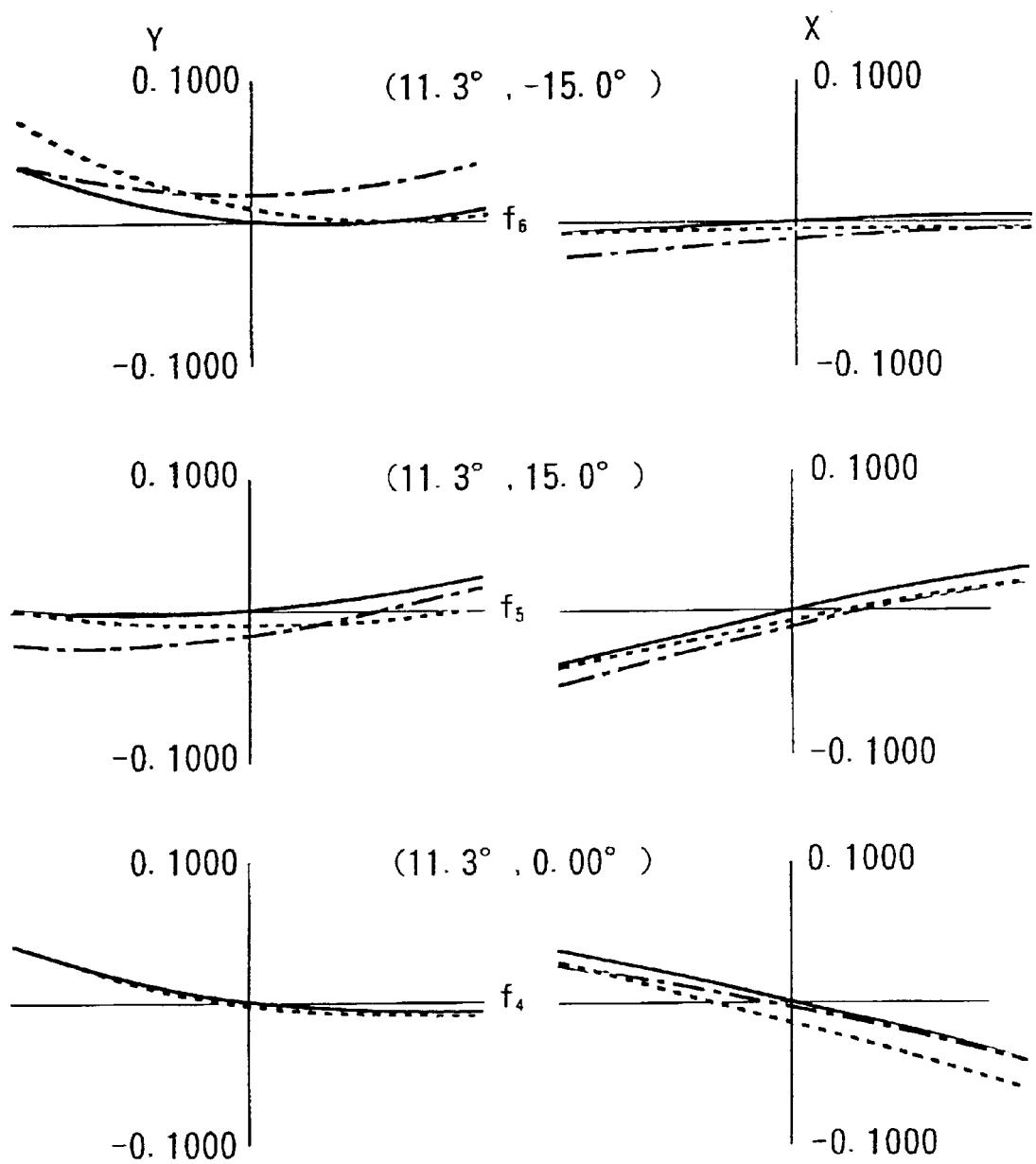
FIG. 7 are transverse aberration diagrams of numerical example 2 in the first embodiment.

FIG. 5 shows a diagram of optical paths in this numerical example 2, and FIG. 6 and FIG. 7 show aberrations in the y and x directions of light fluxes reaching the respective points (f1, f2, f3, f4, f5, and f6) on the image display device shown in FIG. 26 from the pupil E.

NUMERICAL EXAMPLE 3

$\omega x=11.2°$, $\omega y=15.0°$

Surfaces 2 through 5 show a prism lens P, and the medium of the prism lens P is 1.57 in the refractive index and 38 in Abbe's number. In the prism lens P, surfaces 3 and 4 show reflective surfaces, and surfaces 2 and 4 are the same surface. Surface 1 is a pupil plane, and surface 6 is a display surface of the image display device I.

s1 r: ∞ d: 34.04 n: 1.0000
s2 dY 13.87 dZ 34.04 Tilt 4.53
   c4: −4.649e−03 c6: −4.617e−04 c8: −3.995e−05
   c10: 2.269e−06 c11: 0.000e+00 c13: 0.000e+00
   c15: 0.000e+00
s3 dY−1.21 dZ 46.51 Tilt−21.62
   ry: −89.134 rx: −62.971
   p2: 3.455e−04 p3: −2.593e−04 p5: −1.349e−04
   p7: −1.774e−06 p9: 2.937e−06 p10: 1.504e−07
   p12: 3.762e−07 p14: 0.000e+00
s4 dY 13.87 dZ 34.04 Tilt 4.53
   c4: −4.649e−03 c6: −4.617e−04 c8: −3.995e−05
   c10: 2.269e−06 c11: 0.000e+00 c13: 0.000e+00
   c15: 0.000e+00
s5 dY 21.46 dZ 47.24 Tilt 61.09
   r: −135.436
   c4: −7.713e−03 c6: −9.674e−04 c8: 4.461e−04
   c10: 3.353e−04 c11: 0.000e+00 c13: 0.000e+00
   c15: 0.000e+00
s6 dY 28.39 dZ 48.12 Tilt 40.78
   r: ∞ d: 0.00 n: 1.0000

The phase functions of this numerical example are for use of +2nd order diffraction light of the diffraction grating.

Figure 8:
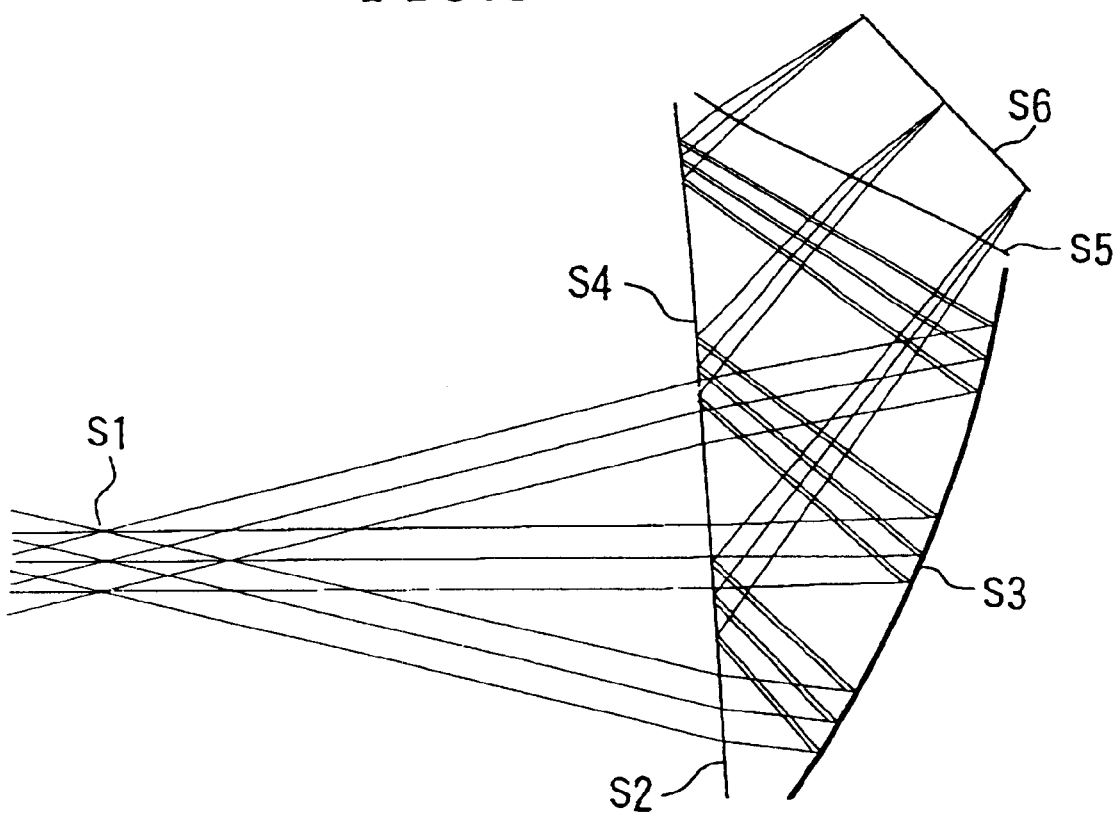
FIG. 8 is a diagram of optical paths of numerical example 3 in the first embodiment.
Figure 9:
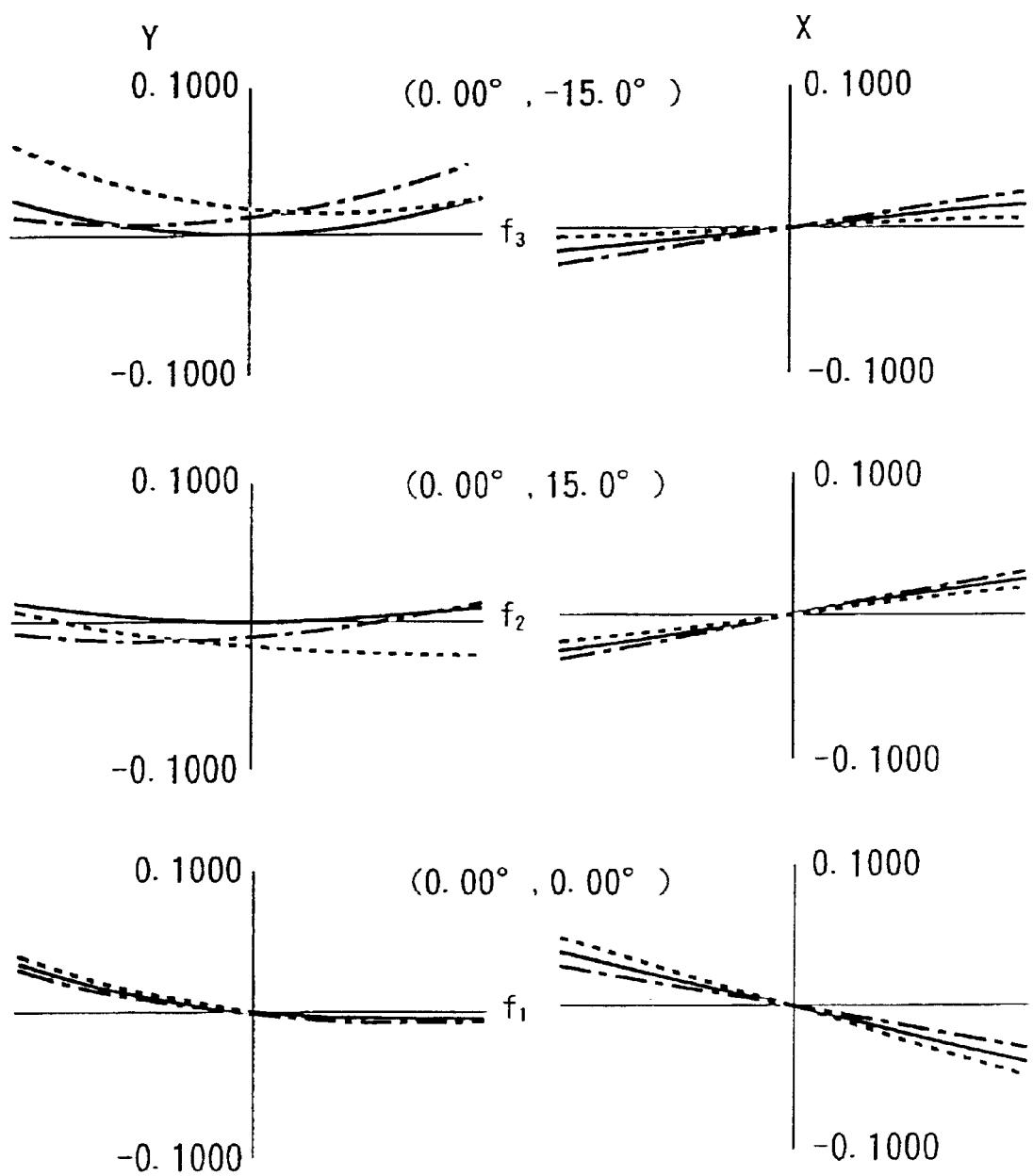
FIG. 9 are transverse aberration diagrams of numerical example 3 in the first embodiment.
Figure 10:
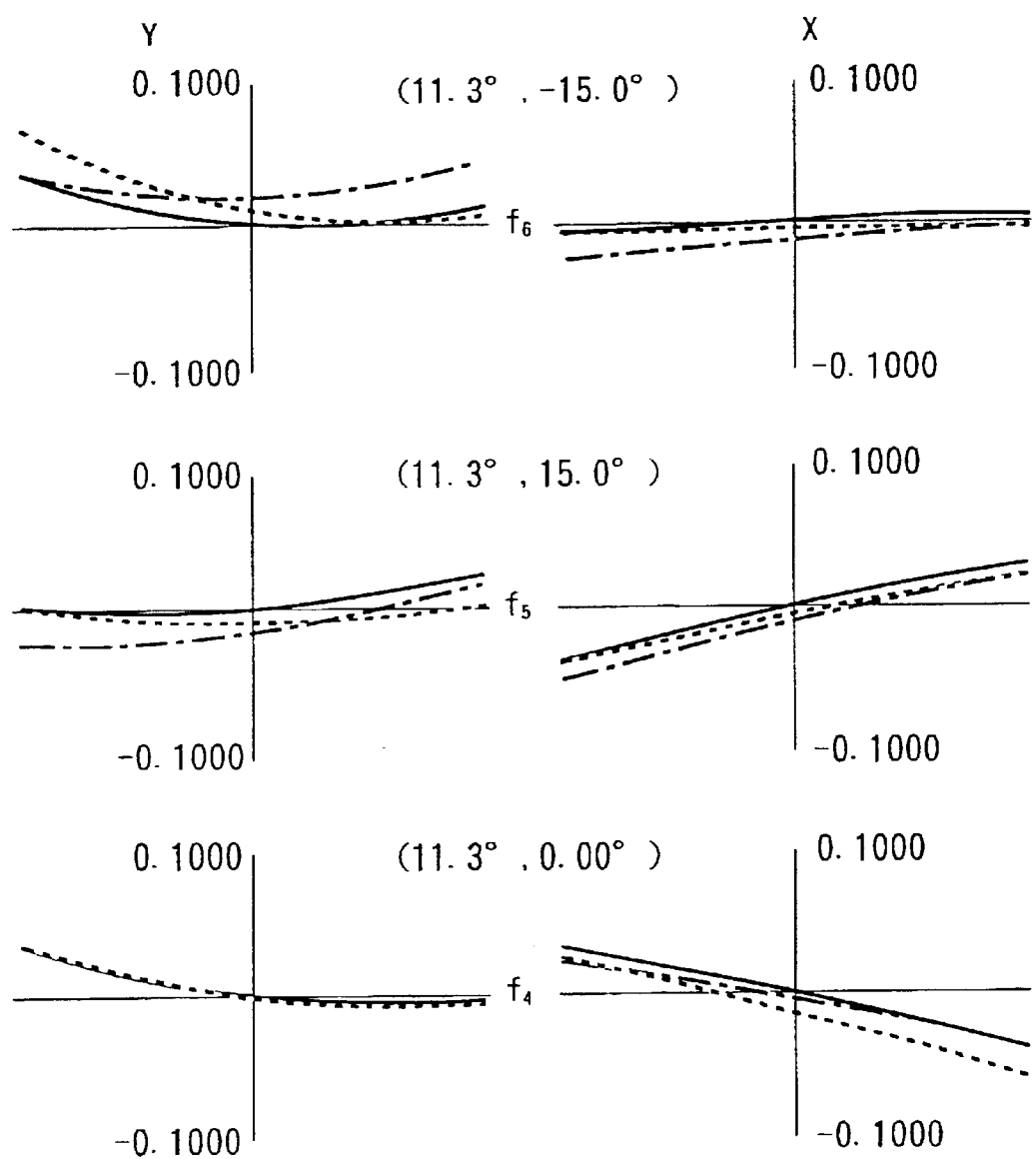
FIG. 10 are transverse aberration diagrams of numerical example 3 in the first embodiment.

FIG. 8 shows a diagram of optical paths in this numerical example 3, and FIG. 9 and FIG. 10 show aberrations in the y and x directions of light fluxes reaching the points (f1, f2, f3, f4, f5, and f6) on the image display device shown in FIG. 26 from the pupil E.

NUMERICAL EXAMPLE 4

$\omega x=15.0°$, $\omega y=11.2°$

Surfaces 2 through 5 show a prism lens P, and the medium of the prism lens P is 1.57 in the refractive index and 38 in Abbe's number. In the prism lens P, surfaces 3 and 4 show reflective surfaces, and surfaces 2 and 4 are the same surface. Surface 1 is a pupil plane, and surface 6 is a display surface of the image display device I.

s1 r: ∞ d: 34.04 n: 1.0000
s2 dY 8.78 dZ 34.04 Tilt 2.96
   c4: −5.393e−03 c6: −2.407e−03 c8: −4.089e−05
   c10: −2.093e−05 c11: 0.000e+00 c13: 0.000e+00
   c15: 0.000e+00
s3 dY−2.74 dZ 46.16 Tilt−20.71
   ry: −71.926 rx: −57.457
   p2: 0.000e+00 p3: −3.350e−04 p5: −4.623e−04
   p7: −1.351e−06 p9: −1.589e−06 p10: −1.275e−07
   p12: 5.688e−07 p14: 0.000e+00
s4 dY 8.78 dZ 34.04 Tilt 2.96
   c4: −5.393e−03 c6: −2.407e−03 c8: −4.089e−05
   c10: −2.093e−05 c11: 0.000e+00 c13: 0.000e+00
   c15: 0.000e+00
s5 dY 16.97 dZ 47.81 Tilt 59.19
   r: −205.266
   c4: −4.182e−03 c6: 4.682e−03 c8: 4.518e−04
   c10: −7.501e−05 c11: 0.000e+00 c13: 0.000e+00
   c15: 0.000e+00
s6 dY 22.95 dZ 49.11 Tilt 36.39
   r: ∞ d: 0.00 n: 1.0000

The phase functions of this numerical example are the same as in numerical example 1, and are for use of +1st order diffraction light of the diffraction grating. In this numerical example, the aspect ratio of the angle of view to the image display device is different.

Figure 11:
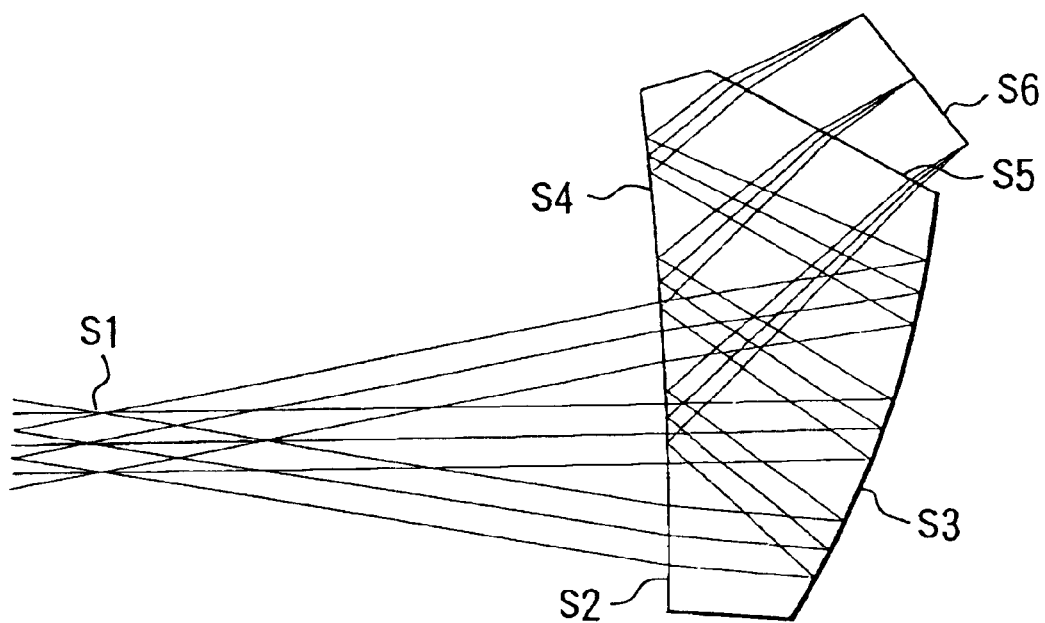
FIG. 11 is a diagram of optical paths of numerical example 4 in the first embodiment.
Figure 12:
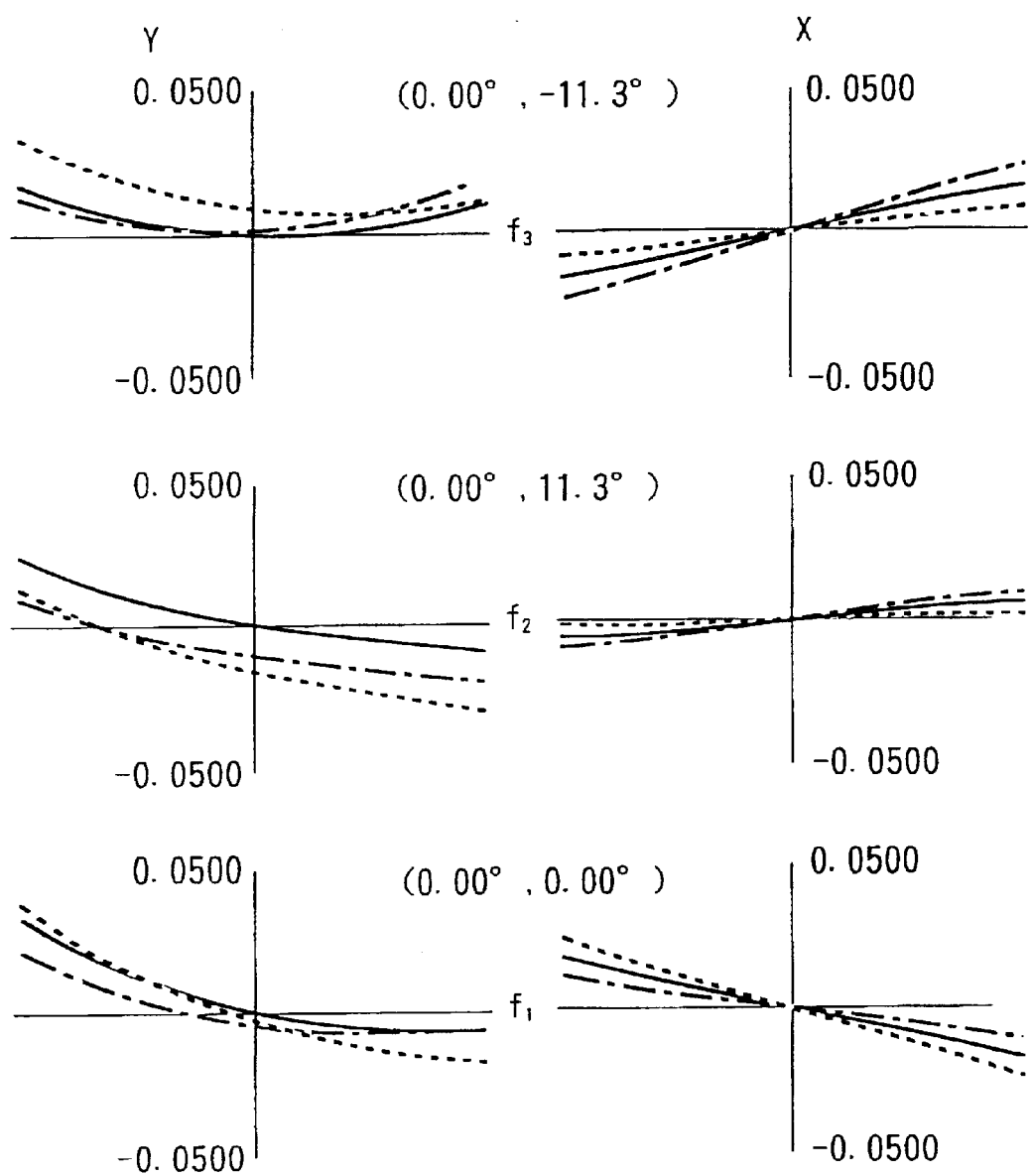
FIG. 12 are transverse aberration diagrams of numerical example 4 in the first embodiment.
Figure 13:
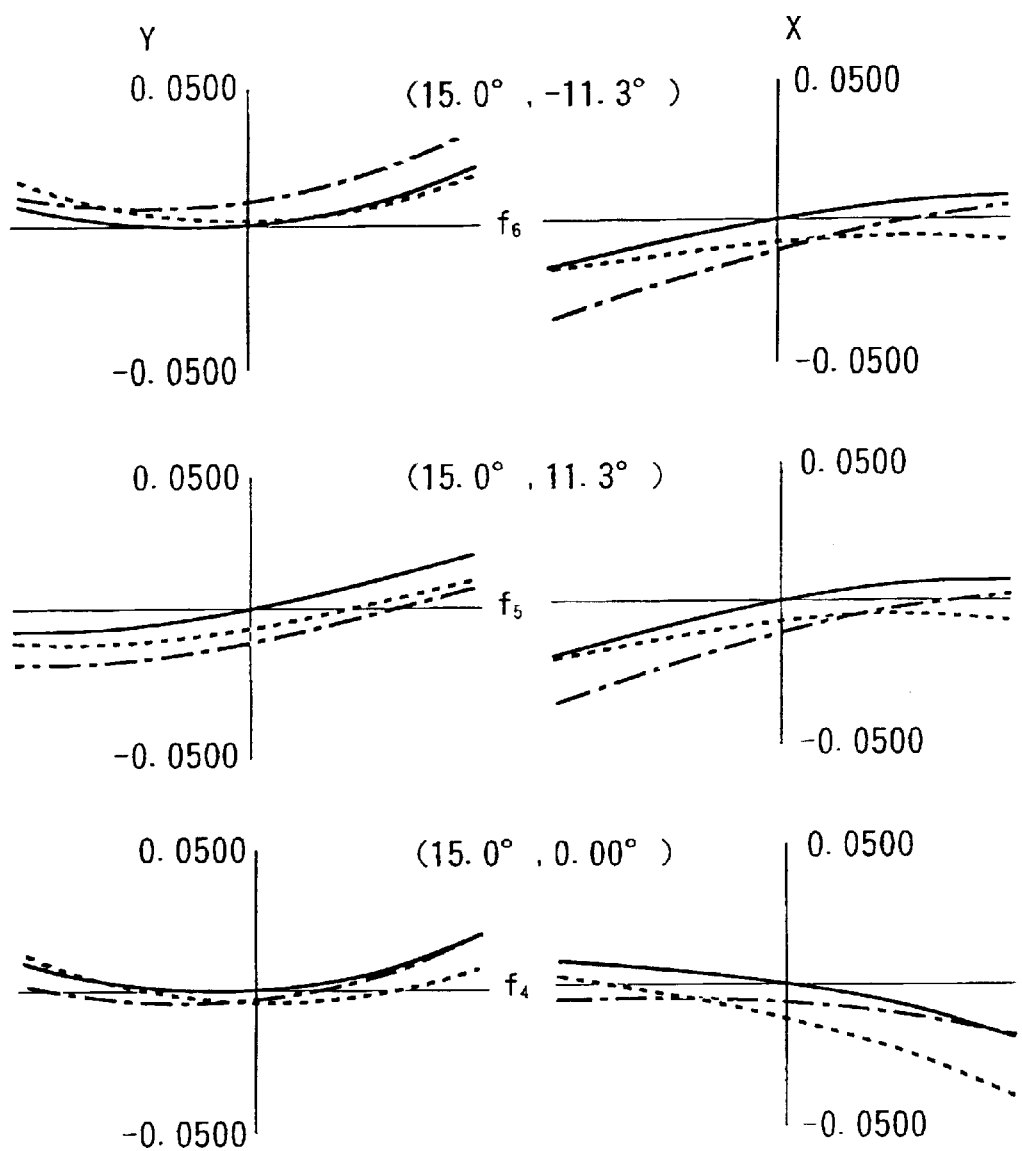
FIG. 13 are transverse aberration diagrams of numerical example 4 in the first embodiment.

FIG. 11 shows a diagram of optical paths in this numerical example 4, and FIG. 12 and FIG. 13 show aberrations in the y and x directions of light fluxes reaching the points (f1, f2, f3, f4, f5, and f6) on the image display device shown in FIG. 26 from the pupil E.

(Second Embodiment)

Figure 14:
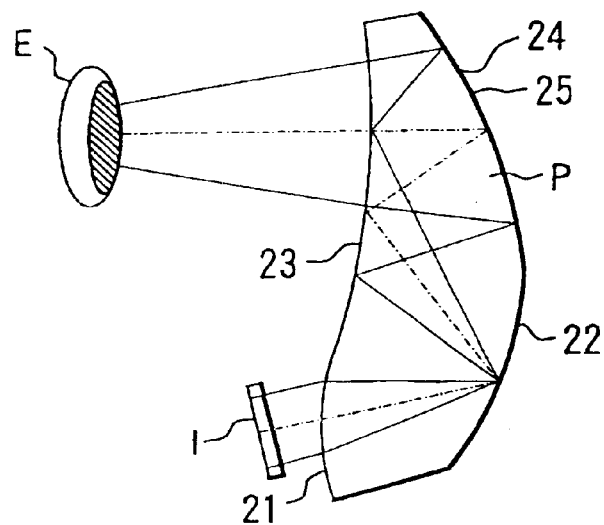
FIG. 14 is a drawing showing the construction of a head-mounted display of a second embodiment of the invention.

FIG. 14 shows the construction of a head-mounted display (image observation apparatus) of a second embodiment of the invention. In this figure, P shows a prism lens comprising a projecting optical device, I shows an image display device such as a liquid crystal display panel or the like, and E shows an observer's eye (pupil).

The prism lens P of this embodiment is comprised of four surfaces, wherein light (image light) made incident on the first surface (first refractive surface) 21 of the prism lens P is reflected by the second surface (reflective surface) 22, made incident on the third surface (second refractive surface) 23 at an angle greater than the critical angle, totally reflected by this third surface 23, and then reflected by the fourth surface (reflective surface), and furthermore, transmitted through the third surface 23 and reaches the observer's eye E.

The light reflection region and transmission region of the third surface 23 partially overlap each other.

Lens data (numerical examples) in a head-mounted display thus constructed is shown below.

In this embodiment, the first surface 21, the second surface 22, and the third surface 23 are asymmetric determined by equation (1), and the shape of the fourth surface 24 is a toroidal surface determined by equation (2). The diffraction optical part 25 is a phase type diffraction grating shaped so as to provide phases that are expressed by equation (3) on the fourth surface 24 with the highest optical power among the four optical action surfaces.

In this embodiment, the base shape of the fourth surface 24 is formed to be asymmetric without a symmetry axis, and the shape of the diffraction optical part 14 is formed in an additional manner to the base shape of the fourth surface 24.

Furthermore, reflective layers are provided on the surface of the grating structure of the diffraction optical part 25, and these reflective layers comprise a reflective surface.

NUMERICAL EXAMPLE 5

$\omega x=8.2°$, $\omega y=11.0°$

Surfaces 2 through 6 show a prism lens P, and the medium of the prism lens P is 1.55 in the refractive index and 55 in Abbe's number. In the prism lens P, surfaces 3, 4, and 5 show reflective surfaces, and surfaces 2 and 4 are the same surface. Surface 1 is a pupil plane, and surface 7 is a display surface of the image display device I.

s1 r: ∞ d: 41.05 n: 1.0000
s2 dY 10.42 dZ 41.05 Tilt 0.00
  c4: −1.361e−02 c6: −1.916e−03 c8: −1.256e−05
  c10: 1.303e−04 c11: 0.000e+00 c13: 0.000e+00
  c15: 0.000e+00
s3 dY 10.78 dZ 54.86 Tilt 25.25
  ry: −43.300 rx: −42.781
  p2: −2.198e−03 p3: 9.798e−05 p5: 8.507e−04
  p7: −1.214e−05 p9: 1.021e−04 p10: −1.388e−06
  p12: −9.312e−07 p14: 0.000e+00
s4 dY 10.42 dZ 41.05 Tilt 0.00
  c4: −1.361e−02 c6: −1.916e−03 c8: −1.256e−05
  c10: 1.303e−04 c11: 0.000e+00 c13: 0.000e+00
  c15: 0.000e+00
s5 dY−26.12 dZ 58.05 Tilt−10.56
  c4: −1.117e−02 c6: −9.732e−03 c8: 3.587e−04
  c10: −4.392e−05 c11: 0.000e+00 c13: 0.000e+00
  c15: 0.000e+00
s6 dY−40.33 dZ 38.68 Tilt 29.75
  c4: 6.042e−02 c6: 4.537e−03 c8: 1.233e−03
  c10: 2.007e−03 c11: 0.000e+00 c13: 0.000e+00
  c15: 0.000e+00
s7 dY−45.00 dZ 19.08 Tilt 20.49
  r: ∞ d: 0.00 n: 1.0000

The phase functions of this numerical example are for use of +1st order diffraction light of the diffraction grating.

Figure 15:
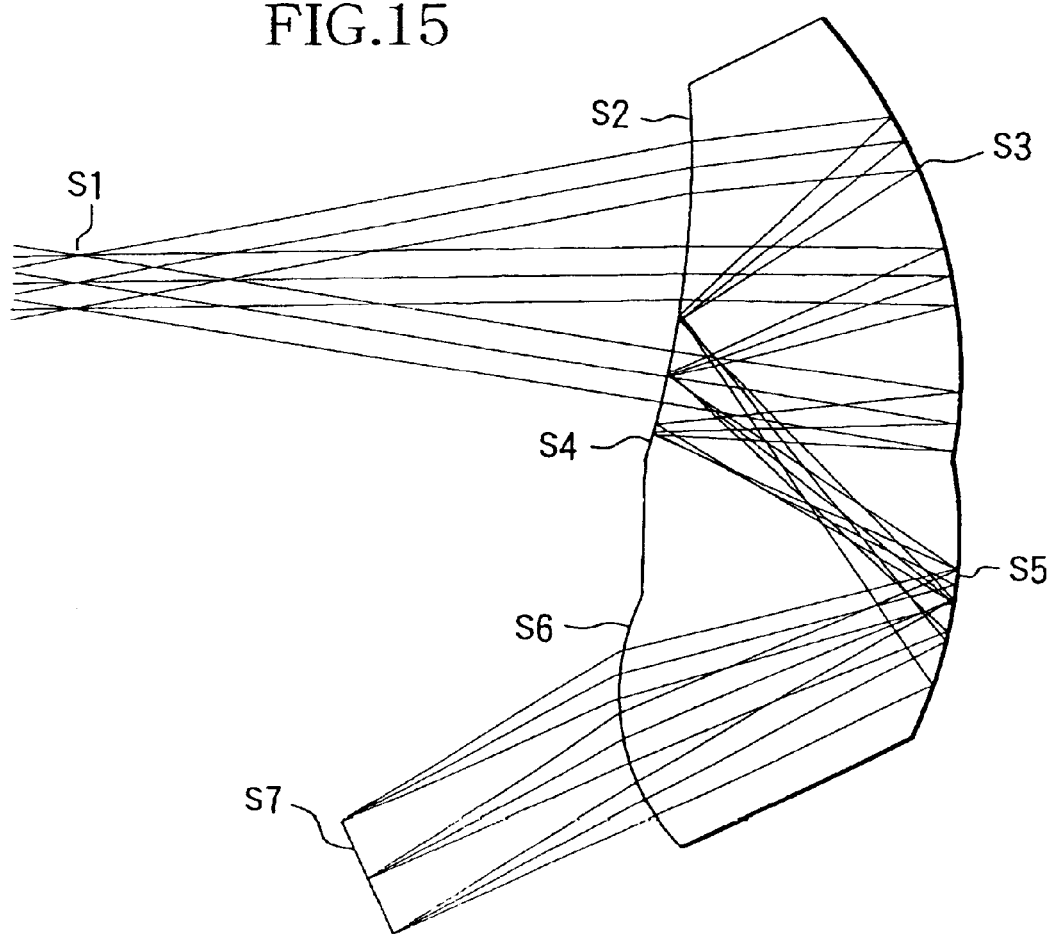
FIG. 15 is a diagram of optical paths of numerical example 5 in the second embodiment.
Figure 16:
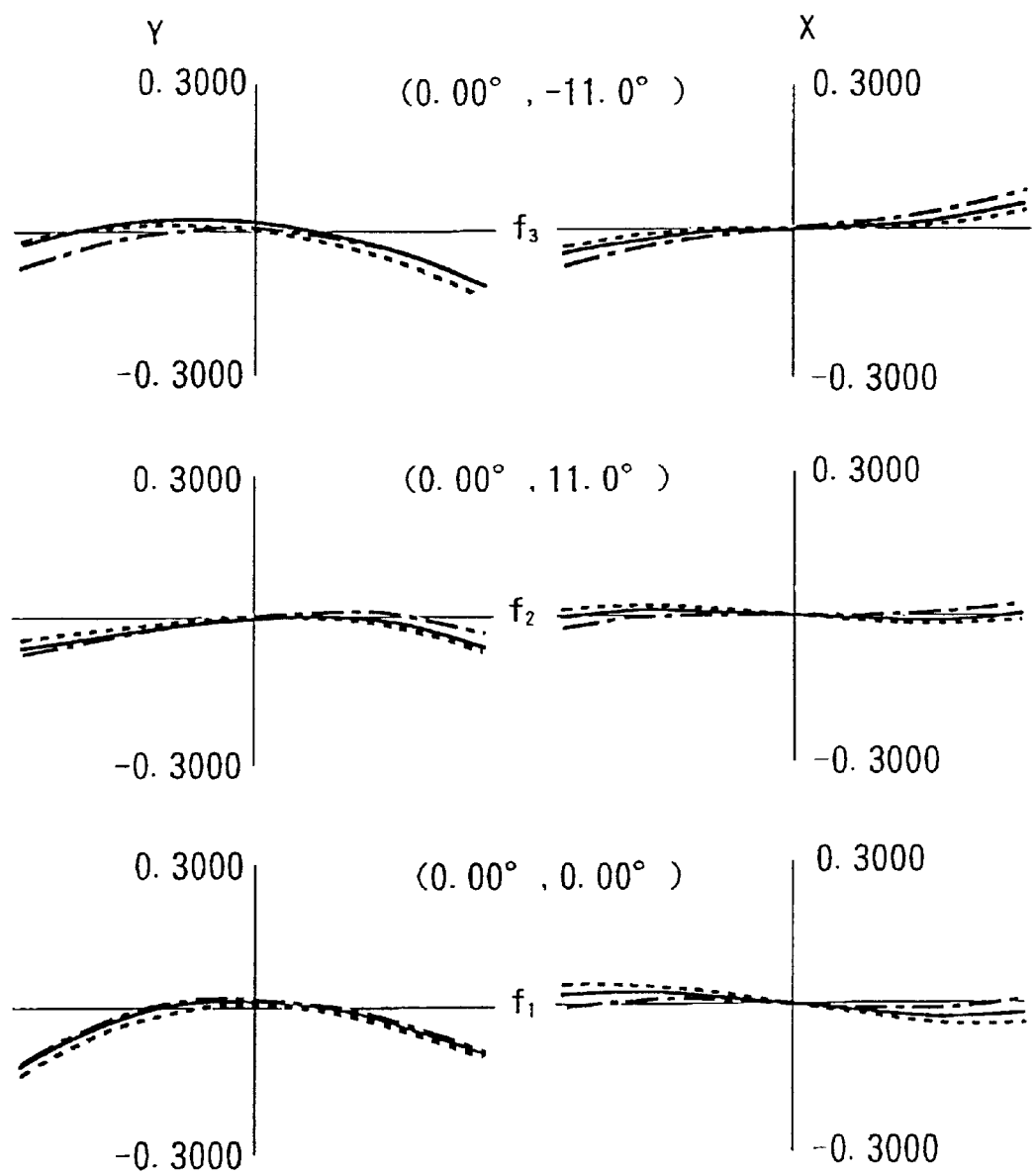
FIG. 16 are transverse aberration diagrams of numerical example 5 in the second embodiment.
Figure 17:
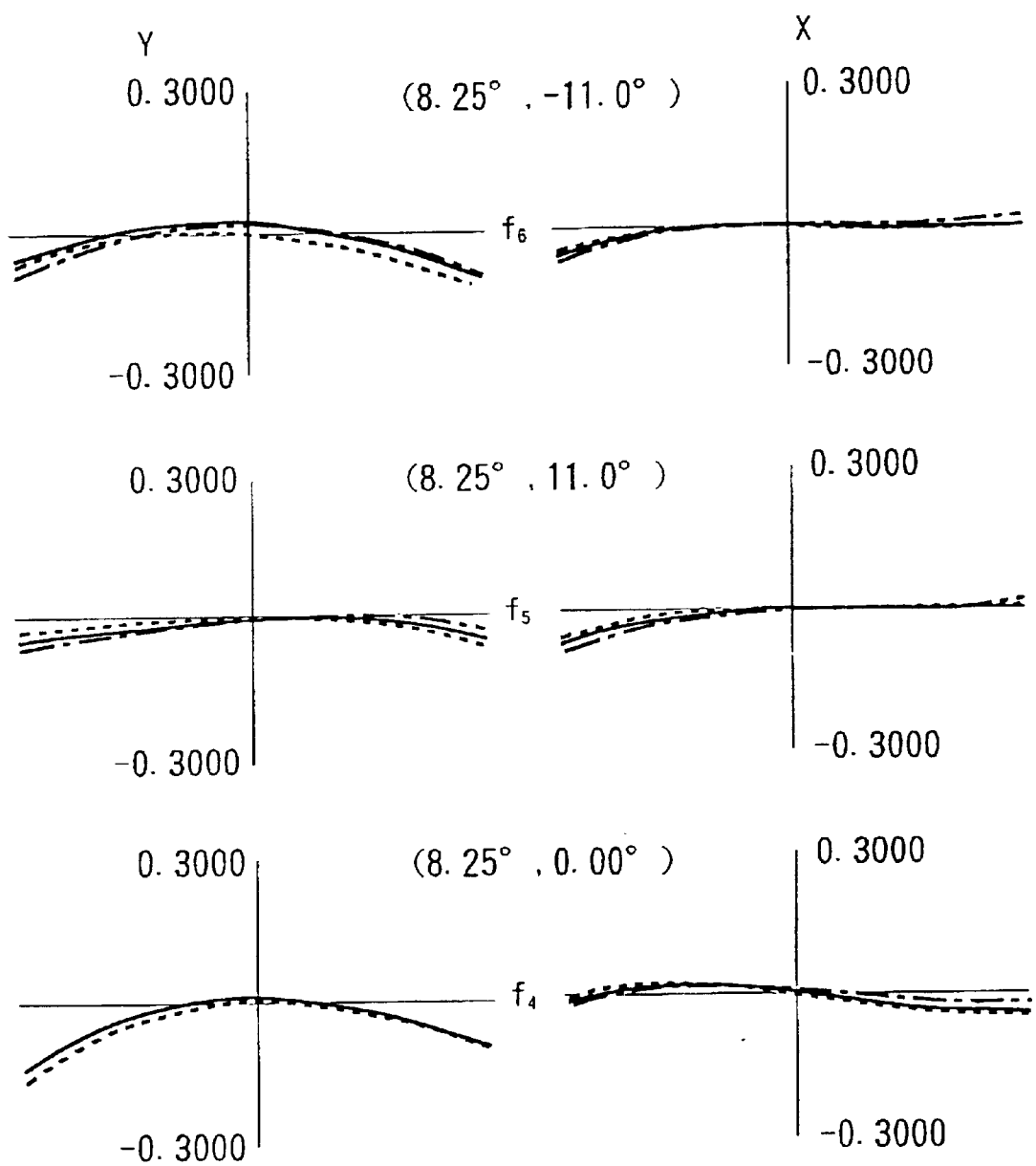
FIG. 17 are transverse aberration diagrams of numerical example 5 in the first embodiment.

FIG. 15 shows a diagram of optical paths in this numerical example 5, and FIG. 16 and FIG. 17 show aberrations in the y and x directions of light fluxes reaching the points (f1, f2, f3, f4, f5, and f6) on the image display device shown in FIG. 26 from the pupil E.

(Third Embodiment)

Figure 18:
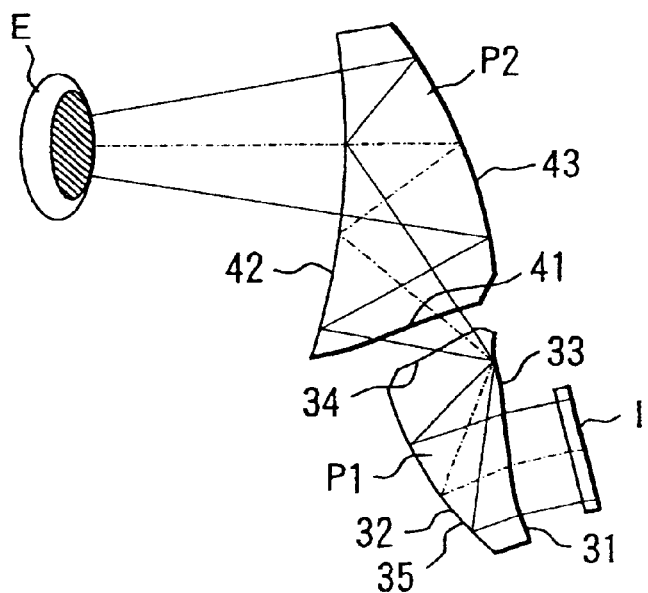
FIG. 18 is a drawing showing the construction of a head-mounted display of a third embodiment of the invention.

FIG. 18 shows the construction of a head-mounted display (image observation apparatus) of a third embodiment of the invention.

In the first and second embodiment, the observation optical system is comprised by one prism lens, however, in this embodiment, two prism lenses P1 and P2 as projecting optical elements comprise the observation optical system. I shows an image display device such as a liquid crystal display panel or the like, and E shows an observer's eye (pupil).

Light (image light) from the image display device I made incident on the first surface (first refractive surface) 31 of the first prism lens P1 is reflected by the second surface (reflective surface), made incident on the third surface (reflective surface) 33 at an angle greater than the critical angle, totally reflected by this third surface 33, and then transmitted through the fourth surface (second refractive surface) 34, and made incident on the first surface 41 of the second prism lens P2.

Light that has been transmitted through the first surface 41 of the second prism lens P2 is made incident on the second surface 42 of the second prism lens P2 at an angle greater than the critical angle and totally reflected, and then reflected by the third surface 43, transmitted through the second surface 42, and reaches the observer's eye E.

Lens data (numerical examples) in the head-mounted display thus constructed is shown below.

In this embodiment, the first surface 31, third surface 33, and fourth surface 34 of the first prism lens P1, and the first surface 41, second surface 42, and third surface 43 of the second prism lens P2 are asymmetric surfaces determined by equation (1), and the shape of the second surface 32 of the first prism lens P1 is a toroidal surface determined by (2), and diffraction optical part 35 is formed on the second surface 32 with the highest optical power among the four optical action surfaces of the first prism lens P1.

In this embodiment, the base shape of the second surface 32 of the first prism lens P1 is formed to be asymmetric without a symmetry axis, and the shape of the diffraction optical part 35 is formed in an additional manner to the base shape of this second surface 32.

Furthermore, reflective layers are provided on the surface of the grating structure of the diffraction optical part 35, and these reflective layers comprise a reflective surface.

NUMERICAL EXAMPLE 6

$\omega x=15.0°$, $\omega y=20°$

Surfaces 2 through 5 show the second prism lens P2, and surfaces 6 through 9 show the first prism lens P1, and the media of the prism lenses are 1.571 in the refractive index and 33.8 in Abbe's number. In the prism lenses P1 and P2, surfaces 3, 4, 7, and 8 show reflective surfaces, and surfaces 2 and 4 are the same surface. Surface 1 shows a pupil plane, and surface 10 shows the display surface of the image display device I.

s1 r: ∞ d: 32.68 n: 1.0000
s2 dY−2.61 dZ 30.36 Tilt−0.24
    c4: −1.167e−03 c6: −1.057e−03 c8: −4.749e−06
    c10: 2.040e−05 c11: 1.964e−06 c13: −5.998e−07
    c15: −2.079e−08
s3 dY 2.36 dZ 46.06 Tilt 22.87
    c4: −8.804e−03 c6: −8.103e−03 c8: 1.526e−05
    c10: 1.002e−05 c11: 0.000e+00 c13: 0.000e+00
    c15: 0.000e+00
s4 dY−2.61 dZ 30.36 Tilt−0.24
    c4: −1.167e−03 c6: −1.057e−03 c8: −4.749e−06
    c10: 2.040e−05 c11: 1.964e−06 c13: −5.998e−07
    c15: −2.079e−08
s5 dY−27.31 dZ 42.70 Tilt−59.64
    c4: 6.277e−05 c6: −4.906e−03 c8: −2.472e−03
    c10: −1.897e−03 c11: −3.699e−05 c13: −2.108e−04
    c15: −1.167e−04
s6 dY−28.47 dZ 44.21 Tilt−37.68
    c4: 3.977e−02 c6: 3.925e−02 c8: −3.153e−03
    c10: −1.458e−03 c11: 0.000e+00 c13: 0.000e+00
    c15: 0.000e+00
s7 dY−36.39 dZ 51.09 Tilt 1.14
    c4: 7.357e−03 c6: 4.692e−03 c8: 3.661e−05
    c10: 2.007e−04 c11: 0.000e+00 c13: 0.000e+00
    c15: 0.000e+00
s8 dY−50.40 dZ 34.43 Tilt 28.79
    ry: 34.415 rx: 33.767
    p2: 6.639e−03 p3: −5.394e−04 p5: 5.608e−05
    p7: 3.670e−05 p9: 4.432e−05 p10: −3.376e−07
    p12: −1.405e−05 p14: 0.000e+00
s9 dY−42.78 dZ 51.21 Tilt 1.09
    c4: −8.657e−03 c6: 2.731e−03 c8: −7.698e−04
    c10: −6.986e−04 c11: 0.000e+00 c13: 0.000e+00
    c15: 0.000e+00
s10 dY−42.33 dZ 57.96 Tilt 10.29
    r: ∞ d: 0.00 n: 1.0000

The phase functions of this numerical example are for use of +1st order diffraction light of the diffraction grating.

Figure 19:
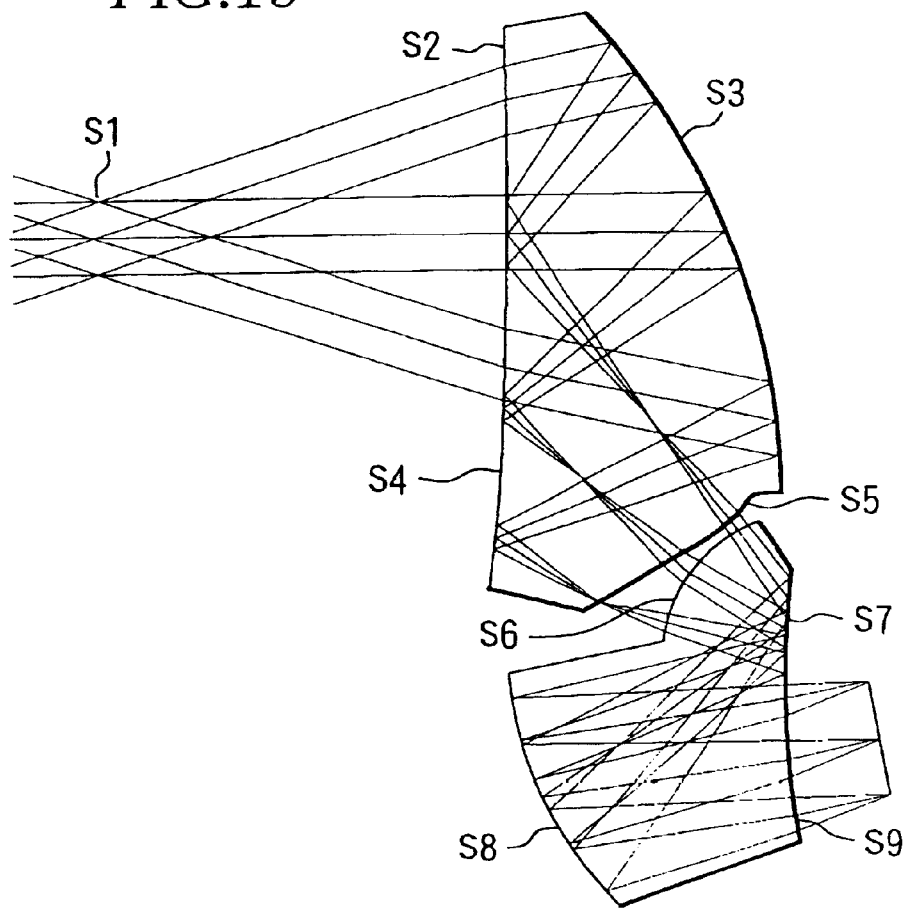
FIG. 19 is a diagram of optical paths of numerical example 6 in the third embodiment.
Figure 20:
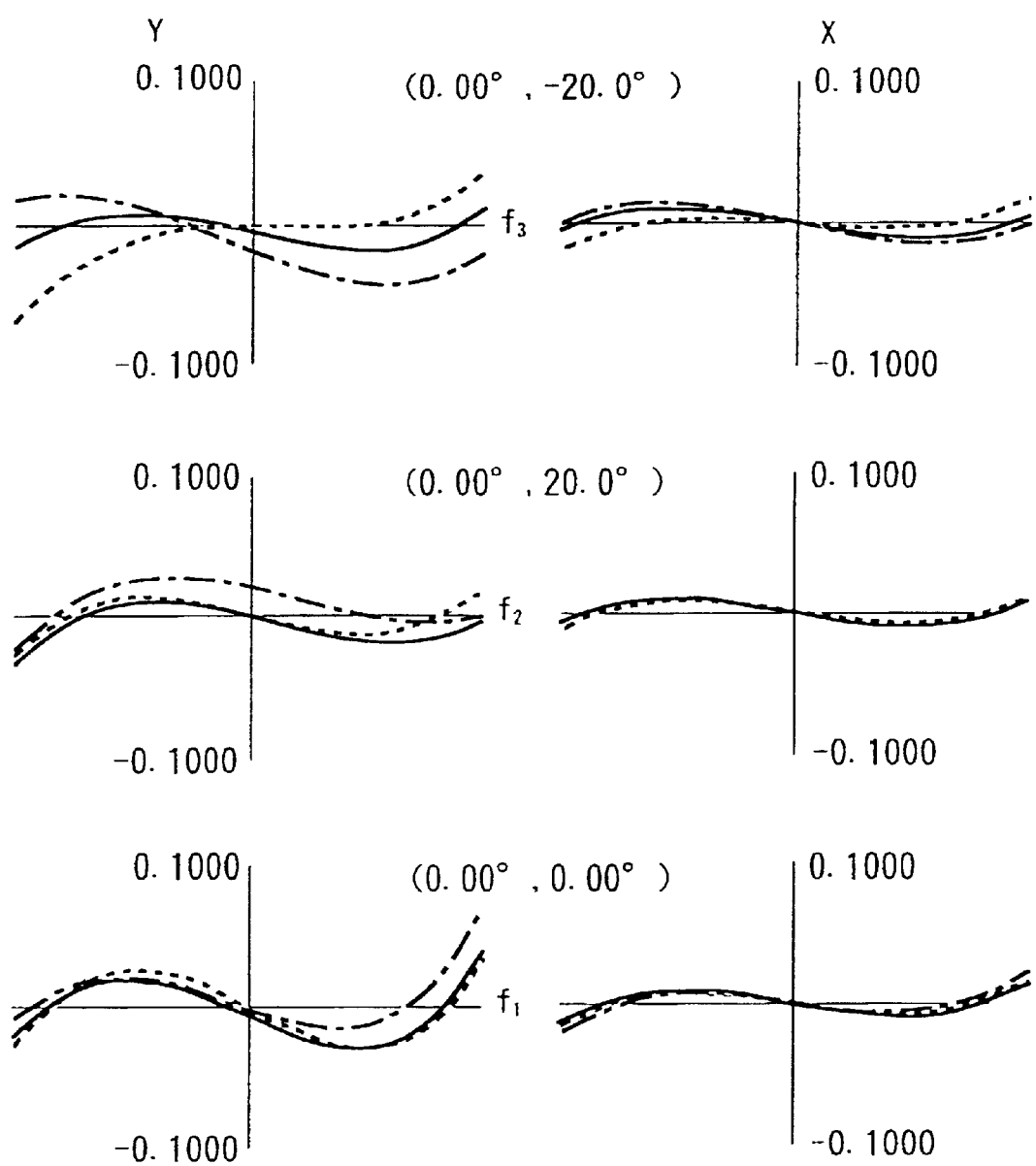
FIG. 20 are transverse aberration diagrams of numerical example 6 in the third embodiment.
Figure 21:
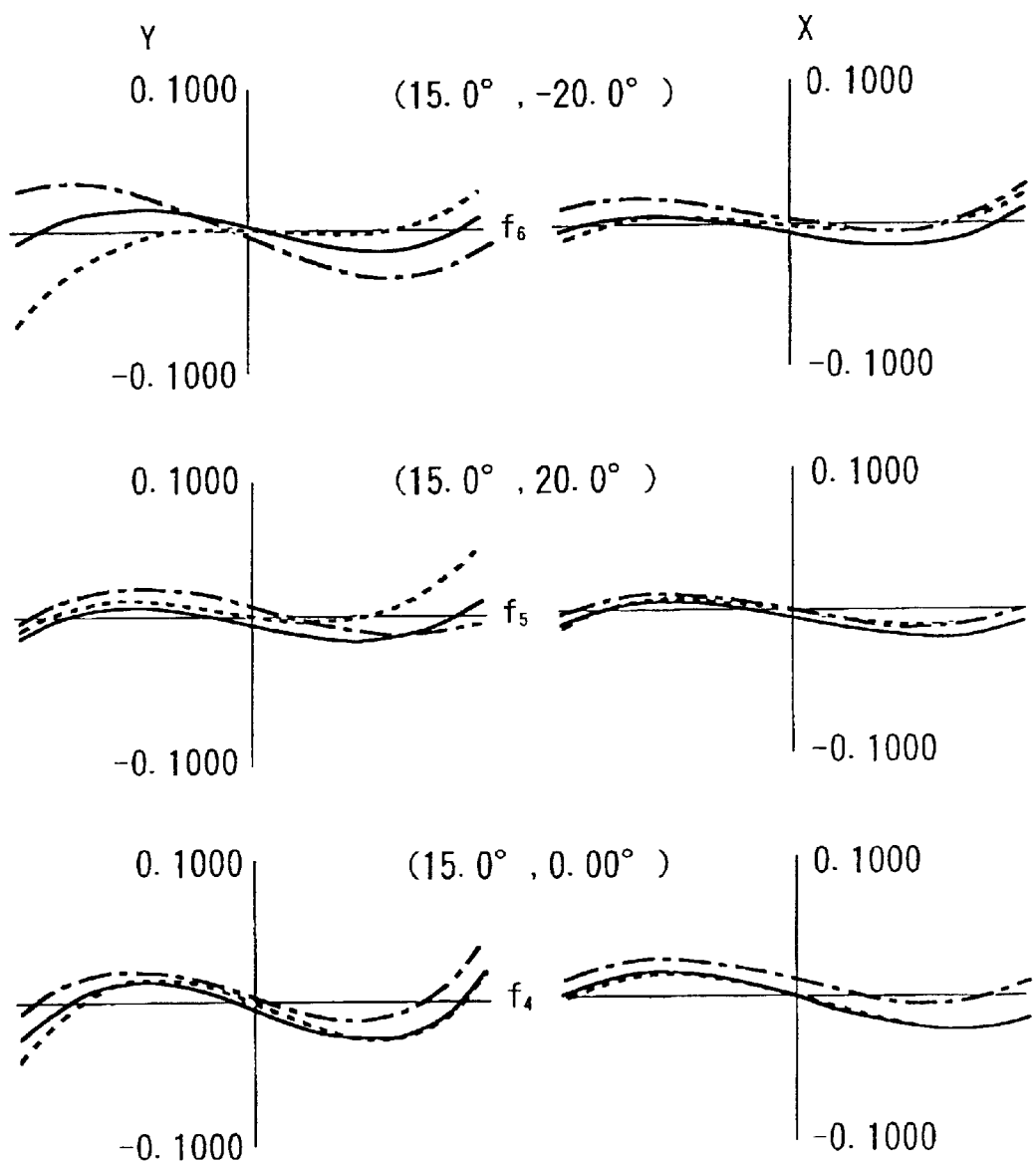
FIG. 21 are transverse aberration diagrams of numerical example 6 in the third embodiment.

FIG. 19 shows a diagram of optical paths in this numerical example 6, and FIG. 20 and FIG. 21 show aberrations in the y and x directions of light fluxes reaching the points (f1, f2, f3, f4, f5, and f6) on the image display device shown in FIG. 26 from the pupil E.

(Fourth Embodiment)

Figure 22:
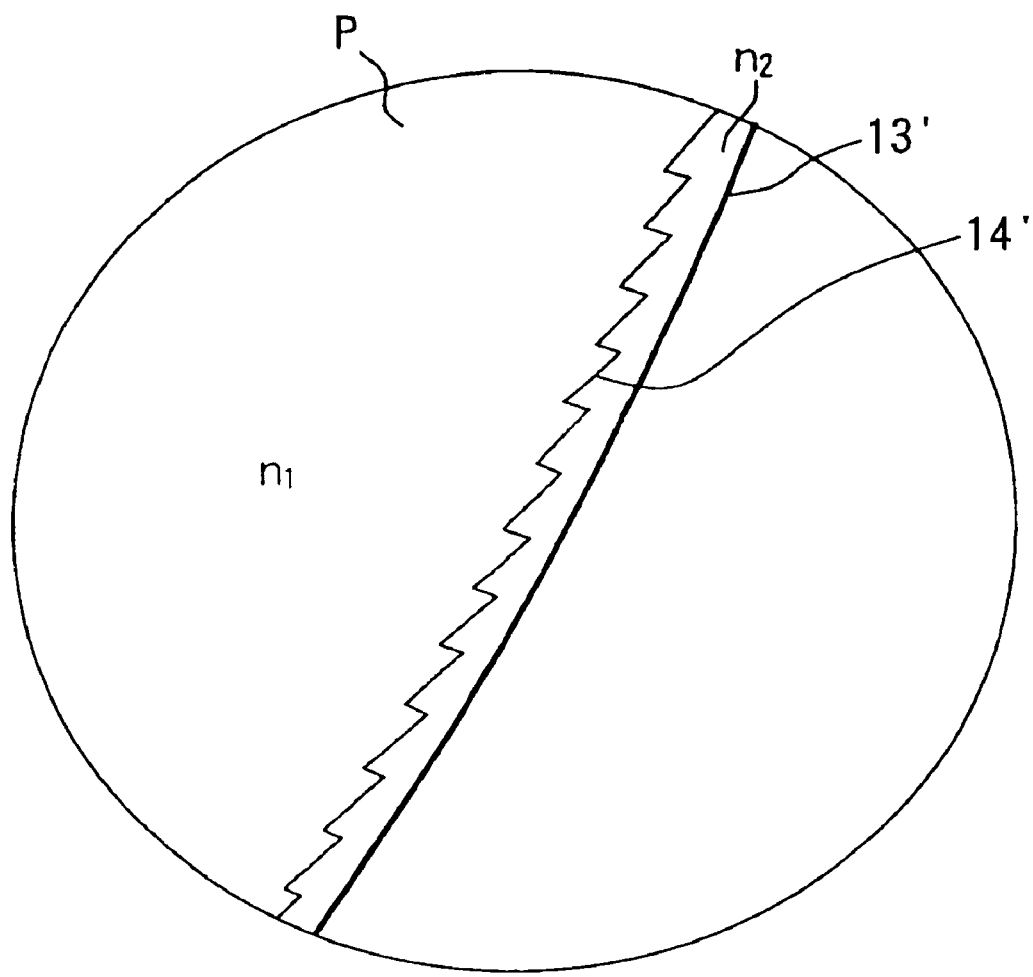
FIG. 22 is a partially enlarged view of a prism lens to be used for a head-mounted display of a fourth embodiment of the invention.

FIG. 22 shows the construction around the reflective surface of the prism lens P of a head-mounted display (image observation apparatus) of a fourth embodiment of the invention.

This embodiment shows a modified example of the prism lens P explained in the first embodiment.

In this embodiment, a diffraction grating structure 14' expressed by equation (3) is provided on the surface corresponding to the third surface 13 of the prism lens P (first material) with the first and second surfaces 11 and 12 formed on it in the first embodiment, and reflective surface 13' is disposed outside the surface of the diffraction grating structure 14'.

A substance (second material) with a refractive index n2 which is different from the refractive index n1 of the substance composing the prism lens P fills between the surface of the diffraction grating structure 14' and reflective surface 13'.

Furthermore, the material filling between the surface of the diffraction grating structure 14' and the reflective surface 13' has an Abbe's number that is different from that of the material composing the prism lens P.

According to this embodiment, the refractive indexes n1 and n2 of the media at the front and rear of the surface of the diffraction grating structure 14' are different from each other, Abbe's numbers are also different from each other, and optical dispersion values of the front and rear media are different from each other. Therefore, while the diffraction efficiency in the image light wavelength region at the diffraction optical part is made uniform, the diffraction efficiency of the entire region can be increased.

In each embodiment mentioned above, the image display device I may be a reflection type image display device or a transmission type image display device. Or, it may be a self-emission type image display device.

Furthermore, in each embodiment mentioned above, head-mounted displays are explained, however, the invention can also be applied to finder units and other observation optical systems for cameras.

As described above, since a diffraction optical element having a diffraction effect is provided in an integral manner with a projecting optical element at or in the vicinity of the reflective surface of the projecting optical element, without controlling with high accuracy of the space between the diffraction optical element and projecting optical element and of positions of these elements, and without causing members for holding the diffraction optical element and projecting optical element to be complicated or increased in size, chromatic aberrations (particularly, chromatic aberrations at the peripheral portion) in the image occurring due to light refraction on the refractive surfaces can be satisfactorily corrected. Therefore, an image with high quality without chromatic aberrations can be observed at a large field angle of view.

In addition, the provision of the diffraction optical element at (or in the vicinity of) the reflective surface makes the design easy, and eliminates the problem in that the shape of the diffraction surface is exposed to the observer's eye.

In addition, in the case where the diffraction optical element is provided on the refractive surface through which image light is transmitted, the height of the step of the diffraction grating becomes equal to the wavelength λ of the image light, however, when the diffraction optical element is provided on the reflective surface, the height of the step of the diffraction grating can be set to λ/2, whereby the manufacturing (mold manufacturing and cutting) of the grating is made easy.

Furthermore, if the reflective surface on which the diffraction optical element is provided is formed so as to have the highest optical power among the plurality of optical action surfaces of the projecting optical device, chromatic aberrations in an image can be effectively corrected.

In the case where the base shape of the reflective surface is formed to be asymmetric without a symmetry axis, if the shape of the diffraction optical element is formed in an additional manner to the base shape of this reflective surface, aberrations other than chromatic aberrations occurring at the diffraction optical element are canceled by the base surface shape of the reflective surface, and only chromatic aberrations can be effectively corrected by the diffraction optical element.

When the plurality of optical action surfaces of the projecting optical element are arranged as decentering systems, if the grating structure of the diffraction optical element is formed to be asymmetric without a symmetry axis, decentering aberrations and asymmetric chromatic aberrations occurring in the case of use in a condition where the optical action surfaces are decentering can be effectively corrected.

Furthermore, a step-like grating structure which comprises a diffraction optical element is directly formed at the reflective surface, and reflective layers are provided on the step-like surfaces in this grating structure, whereby chromatic aberration can be corrected by such a simple construction.

Furthermore, a projecting optical element is constructed so that a grating structure which comprises a diffraction optical element is formed at the surface of the first substance having a refractive surface, the reflective surface is disposed near the diffraction optical element, the space between the diffraction optical element and reflective surface is filled with a substance that is different from the first substance, and the refractive indexes and Abbe's numbers of the first and second substances are made different from each other, whereby the optical dispersion values become different between the front and rear of the medium of the diffraction optical element, and the diffraction efficiency in the diffraction optical element can be totally increased while being made almost uniform in a wavelength region to be used.

What is claimed is:

1. An image observation apparatus comprising:
    an image display element for displaying images; and
    an optical element for guiding image light from said image display element to an observers eye, where said optical element comprises:
        a first refractive surface on which the image light is made incident;
        a reflective surface for reflecting the image light that has been made incident from said first refractive surface;
        a diffraction optical part provided in front of said reflective surface and at a position through which the image light proceeding to said reflective surface and reflected on said reflective surface passes; and
        a second refractive surface for emitting the image light that has been reflected by said reflective surface.

2. An image observation apparatus according to claim 1, wherein
    said second refractive surface reflects image light that has been made incident inside said optical element from said first refractive surface toward said reflective surface, and emits image light that has been reflected by said reflective surface to the outside of said optical element.

3. An image observation apparatus according to claim 2, wherein
    a region of said second refractive surface for reflecting the image light that has been made incident inside said optical element from said first refractive surface and a region of a second refractive surface for emitting the image light that has been reflected by said reflective surface to the outside of said projecting optical element at least partially overlap each other.

4. An image observation device according to claim 1, wherein
    said reflective surface is a surface with the strongest optical power among optical action surfaces of said optical element.

5. An image observation apparatus according to claim 1, wherein
    said optical element has a plurality of reflective surfaces, and said diffraction optical part is provided in front of the reflective surface with the strongest optical power among said plurality of reflective surfaces and at a position through which the image light proceeding to said reflective surface and reflected on said reflective surface passes.

6. An image observation apparatus according to claim 1, wherein
    the reflective surface is shaped rotationally asymmetric.

7. An image observation apparatus according to claim 1, wherein a grating structure comprising said diffraction optical part is shaped to be rotationally asymmetric.

8. An image observation apparatus according to claim 1, wherein
    a grating structure comprising said diffraction optical part is formed on a surface of material having said first refractive surface and said second refractive surface, and reflective layers are provided on a surface of said grating structure.

9. An image observation apparatus according to claim 1, wherein
    a grating structure comprising said diffraction optical part is formed at a surface of first material having said first refractive surface and said second refractive surface, said reflective surface is disposed near a surface of said grating structure, and space between a surface of said grating structure and said reflective surface is filled with a second material that is different from said first material.

10. An image observation apparatus according to claim 1, wherein
    refractive indexes of said first material and said second material are different from each other.

11. An image observation apparatus according to claim 10, wherein
    Abbe's numbers of said first material and said second material are different from each other.

12. An image observation apparatus according to claim 1, wherein
    said image display element is a reflection type image display element.

13. An image observation apparatus according to claim 1, wherein
    said image display element is a transmission type image display element.

14. An image observation apparatus according to claim 1, wherein
    said image display element is a self-emission type image display element.

15. An image observation system comprising:
    said image observation apparatus of claim 1; and
    an image supply apparatus for supplying image information for said image observation apparatus.

16. An image observation apparatus comprising:
    an image display element for displaying images; and
    an optical element for guiding image light from said image display element to an observer's eye, where said optical element comprises:
        a first refractive surface on which the image light is made incident;
        a reflective surface for reflecting the image light that has been made incident from said first refractive surface, where a diffraction optical part is provided on said reflective surface; and
        a second refractive surface for emitting the image light that has been reflected by said reflective surface.

17. An image observation apparatus according to claim 16, wherein
said second refractive surface reflects image light that has been made incident inside said optical element from said first refractive surface toward said reflective surface, and emits image light that has been reflected by said reflective surface to the outside of said optical element.

18. An image observation apparatus according to claim 17, wherein
a region of said second refractive surface for reflecting the image light that has been made incident inside said optical element from said first refractive surface and a region of a second refractive surface for emitting the image light that has been reflected by said reflective surface to the outside of said projecting optical element at least partially overlap each other.

19. An image observation device according to claim 16, wherein
said reflective surface is a surface with the strongest optical power among optical action surfaces of said optical element.

20. An image observation apparatus according to claim 16, wherein
said optical element has a plurality of reflective surfaces, and said diffraction optical part is provided on the reflective surface with the strongest optical power among said plurality of reflective surfaces.

21. An image observation apparatus according to claim 16, wherein
the reflective surface is shaped rotationally asymmetric.

22. An image observation apparatus according to claim 16, wherein a grating structure comprising said diffraction optical part is shaped to be rotationally asymmetric.

23. An image observation apparatus according to claim 16, wherein
a grating structure comprising said diffraction optical part is formed on a surface of material having said first refractive surface and said second refractive surface, and reflective layers are provided on a surface of said grating structure.

24. An image observation apparatus according to claim 16, wherein
a grating structure comprising said diffraction optical part is formed at a surface of first material having said first refractive surface and said second refractive surface, said reflective surface is disposed near a surface of said grating structure, and space between a surface of said grating structure and said reflective surface is filled with a second material that is different from said first material.

25. An image observation apparatus according to claim 16, wherein
refractive indexes of said first material and said second material are different from each other.

26. An image observation apparatus according to claim 25, wherein
Abbe's numbers of said first material and said second material are different from each other.

27. An image observation apparatus according to claim 16, wherein
said image display element is a reflection type image display element.

28. An image observation apparatus according to claim 16, wherein
said image display element is a transmission type image display element.

29. An image observation apparatus according to claim 16, wherein
said image display element is a self-emission type image display element.

30. An image observation system comprising:
said image observation apparatus of claim 16; and
an image supply apparatus for supplying image information for said image observation apparatus.

* * * * *

UNITED STATES PATENT AND TRADEMARK OFFICE
CERTIFICATE OF CORRECTION

PATENT NO. : 6,590,713 B2
DATED : July 8, 2003
INVENTOR(S) : Atsushi Okuyama

It is certified that error appears in the above-identified patent and that said Letters Patent is hereby corrected as shown below:

<u>Column 9,</u>
Line 10, "surface)," should read -- surface) 24, --.

<u>Column 10,</u>
Line 24, "surface)," should read -- surface) 32, --.
Line 44, "(2)," should read -- equation (2), --.

<u>Column 13,</u>
Line 28, "observers" should read -- observer's --.
Line 58, "device" should read -- apparatus --.

Signed and Sealed this

Second Day of March, 2004

JON W. DUDAS
*Acting Director of the United States Patent and Trademark Office*